US012706706B2

(12) United States Patent
Fang et al.

(10) Patent No.: US 12,706,706 B2
(45) Date of Patent: Aug. 11, 2026

(54) ULTRA-LOW LATENCY (ULL) COMMUNICATIONS USING A DEDICATED RESOURCE UNIT (RU)

(71) Applicant: Intel Corporation, Santa Clara, CA (US)

(72) Inventors: Juan Fang, Portland, OR (US); Laurent Cariou, Milizac (FR); Minyoung Park, San Ramon, CA (US); Dave A. Cavalcanti, Portland, OR (US); Xiaogang Chen, Portland, OR (US); Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/896,365

(22) Filed: Aug. 26, 2022

(65) Prior Publication Data

US 2023/0028874 A1 Jan. 26, 2023

(51) Int. Cl.

| | |
|---|---|
| ***H04L 5/00*** | (2006.01) |
| ***H04W 72/0446*** | (2023.01) |
| ***H04W 72/21*** | (2023.01) |
| ***H04W 72/53*** | (2023.01) |

(52) U.S. Cl.

CPC .......... *H04L 5/0007* (2013.01); *H04L 5/0048* (2013.01); *H04W 72/0446* (2013.01); *H04W 72/21* (2023.01); *H04W 72/53* (2023.01)

(58) Field of Classification Search

CPC ............... H04L 5/0007; H04L 5/0048; H04W 72/0446; H04W 72/21; H04W 72/53; H04W 72/512; H04W 72/569; H04W 84/12; H04W 72/1268; H04W 72/23

See application file for complete search history.

(56) References Cited

U.S. PATENT DOCUMENTS

| | | | | |
|---|---|---|---|---|
| 2018/0184468 A1* | 6/2018 | Chien | .................. | H04W 76/36 |
| 2018/0376493 A1* | 12/2018 | Li | .................. | H04W 72/04 |
| 2021/0410149 A1* | 12/2021 | Xia | .................. | H04W 72/30 |

(Continued)

*Primary Examiner* — Rina C Pancholi

(74) *Attorney, Agent, or Firm* — Schwegman Lundberg & Woessner, P.A.

(57) ABSTRACT

Embodiments disclosed herein are directed to communicating time-critical ultra-low latency (ULL) data using one or more dedicated resource units (RUs). A station (STA) decodes a trigger frame received from an access point station (AP) encoded to indicate resource units (RUs) of an UL PPDU for an uplink multi-user orthogonal frequency division multiple access (UL MU OFDMA) data transmission by a first and a second station STA. The trigger frame may also be encoded to indicate configuration information for a dedicated RU for time-critical ultra-low latency (ULL) UL data. The dedicated RU may be one RU of one or more RUs of the UL PPDU that are reserved for time-critical communications. The STA may encode time-critical ULL UL data for transmission to the AP on the dedicated RU during the uplink MU OFDMA data transmission by the first and second STAs. The time-critical ULL UL data may start at any time during transmission of the UL PPDU. Medium access control layer (MAC) padding may be included in a MAC payload until the time-critical ULL UL data is available at the MAC layer of the STA.

17 Claims, 12 Drawing Sheets

(56) References Cited

U.S. PATENT DOCUMENTS

| | | | | |
|---|---|---|---|---|
| 2022/0330270 | A1* | 10/2022 | Das | H04W 72/0446 |
| 2022/0408409 | A1* | 12/2022 | Viger | H04W 72/02 |
| 2023/0028973 | A1* | 1/2023 | Fang | H04W 72/1263 |

* cited by examiner

EHT MU PPDU Format

EHT TB PPDU format

RU Locations in an 80 MHz PPDU

ULTRA-LOW LATENCY (ULL) COMMUNICATIONS USING A DEDICATED RESOURCE UNIT (RU)

TECHNICAL FIELD

Embodiments pertain to wireless communications. Some embodiments relate to wireless networks including wireless local area networks (WLANS) including those operating in accordance with the IEEE 802.11 standards. Some embodiments relate to wireless time-sensitive networks (TSN) and wireless time-sensitive networking (WTSN). Some embodiments pertain to time-critical ultra-low latency (ULL) data communication.

BACKGROUND

One issue with communicating data over a wireless network is Emerging time-sensitive (TS) applications represent new markets for Wi-Fi. Industrial automation, robotics, AR/VR and HMIs (Human-Machine Interface) are example applications. Many time-sensitive applications require ultra-low latency (ULL) with minimal queuing and medium access delay within a wireless system. For instance, Programable Logic Controller (PLCs) may execute control loops requiring isochronous (cyclic) transmission of small time-critical (TC) packets (typically a few bytes) with cycles of 10's of microseconds. Furthermore, applications that need ULL typically also require very high reliability. The ULL requirement for TC packets practically imposes very high reliability requirements as multiple retransmissions (following the typical Wi-Fi protocols) are not feasible.

Although IEEE 802.11ax has introduced triggered-based OFDMA operation, the overhead involved in the basic trigger-based data exchange within a TXOP is high, especially for small packet sizes. Many time-sensitive applications involve isochronous (cyclic) transmission of small packets (typically a few bytes) within very short cycles with high reliability. Thus what is needed are communication techniques suitable for time-sensitive applications that require lower overhead and are compatible with legacy network communications (i.e., IEEE 802.11ax and previous versions of the 802.11 standard).

Thus, what is needed is improved techniques to communicate time-critical ULL data.

DETAILED DESCRIPTION

Figure 1A:
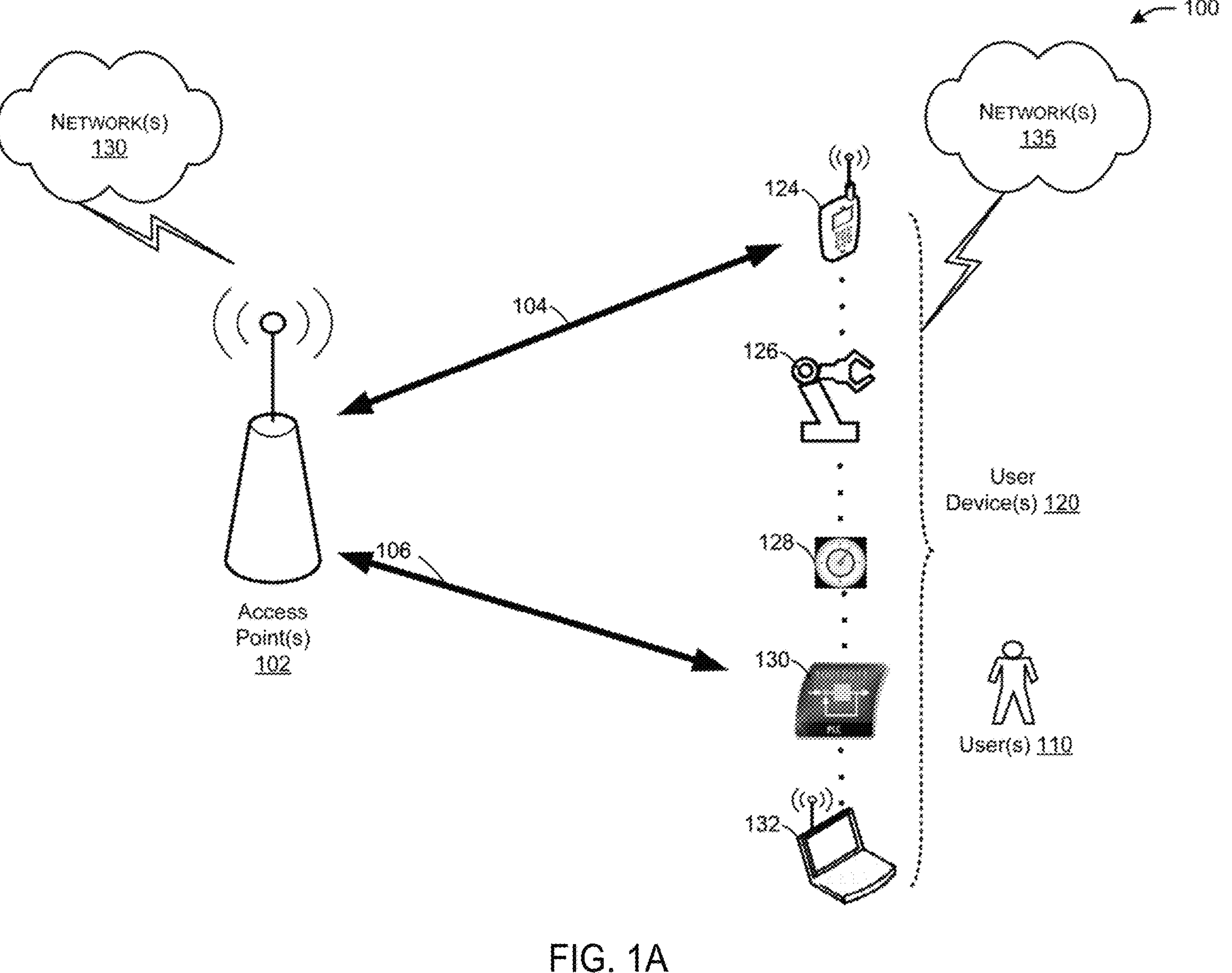
FIG. 1A illustrates an example network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to communicating time-critical ultra-low latency (ULL) data using one or more dedicated resource units (RUs). In some embodiments, a station (STA) decodes a trigger frame received from an access point station (AP) encoded to indicate resource units (RUs) of an UL PPDU for an uplink multiuser orthogonal frequency division multiple access (UL MU OFDMA) data transmission by a first and a second station STA. The trigger frame may also be encoded to indicate configuration information for a dedicated RU for time-critical ultra-low latency (ULL) UL data. The dedicated RU may be one RU of one or more RUs of the UL PPDU that are reserved for time-critical communications. The STA may encode time-critical ULL UL data for transmission to the AP on the dedicated RU during the uplink MU OFDMA data transmission by the first and second STAs. The time-critical ULL UL data may start at any time during transmission of the UL PPDU. Medium access control layer (MAC) padding may be included in a MAC payload until the time-critical ULL UL data is available at the MAC layer of the STA. These embodiments as well as others are described in more detail below.

Reliable and deterministic communications between devices may be required in some circumstances. One example may be time sensitive networking (TSN). TSN applications may require very low and bounded transmission latency and high availability and may include a mix of traffic patterns and requirements from synchronous data flows (e.g., from sensors to a controller in a closed loop control system), to asynchronous events (e.g., a sensor detecting an anomaly in a monitored process and sending a report right away), to video streaming for remote asset monitoring and background IT/office traffic. Many TSN applications also may require communication between devices with ultra-low latency (e.g., on the order of tens of microseconds).

Autonomous systems, smart factories, professional audio/video, and mobile virtual reality are examples of time sensitive applications that may require low and deterministic latency with high reliability. Deterministic latency/reliability may be difficult to achieve with existing Wi-Fi standards (e.g., the IEEE 802.11 family of standards), which may focus on improving peak user throughput (e.g., the IEEE 802.11ac standard) and efficiency (e.g., the IEEE 802.11ax standard). Extending the application of Wi-Fi beyond consumer-grade applications to provide wireless TSN (WTSN) performance presents an opportunity to apply Wi-Fi to Internet of things (TOT), and new consumer markets (e.g., wireless virtual reality). The non-deterministic nature of the IEEE 802.11 medium access control (MAC) layer in an unlicensed spectrum may impose challenges to expanding the application of Wi-Fi in this manner, especially when trying to guarantee reliability in comparison to Ethernet TSN applications.

It may be desirable to enable time-synchronized and scheduled MAC layer communications to facilitate time sensitive transmissions over Wi-Fi. The MAC may benefit from a more flexible control/management mechanism to adapt scheduling and/or transmission parameters (e.g., adapt a modulation and coding scheme and increase power) to control latency and to increase reliability. For example, changes in a wireless channel, such as interference or fading, may trigger retransmissions, which may impact the latency for time sensitive data due to increased channel throughput. An access point (AP) may update station (STA) transmission parameters to increase reliability (e.g., increase transmission power), which may require a transmission schedule update. An AP may also reduce a number of STAs that share a given service period to provide more capacity for retransmissions within a maximum required latency. Another example may include high-priority data (e.g., random alarms/events in an industrial control system), which may need to be reported with minimal latency, but cannot be scheduled a priori. Although regular beacons may be used to communicate scheduling and other control/management updates, it may be desirable to have a more deterministic and flexible control mechanism in future Wi-Fi networks that may enable faster management/scheduling of a wireless channel to facilitate time sensitive applications with high reliability and efficiency.

It may also be desirable to ensure that devices in a network or extended service set (ESS) receive schedule updates and maintain a synchronized schedule. Once a time sensitive transmission schedule is updated, all devices may need to receive the updated schedule before the schedule may become applicable, otherwise the updated schedule may not be reliable (e.g., not all devices may properly follow the schedule). To meet the requirements of time sensitive traffic, it may be desirable to ensure that all relevant devices comply with schedule updates regardless of active and sleep states of the devices.

To enable synchronization and scheduling, control/management frames may be used. Control/management frames may share a channel with data frames. It may be desirable, however, to have a dedicated channel for control/management frames that may be separate from a data channel. In addition, it may be desirable to have mechanisms to enable dynamic control/management actions using controlled latency and high reliability. Something other than beacon transmissions by themselves may be beneficial to enable dynamic and fast updates to operations required to maintain a quality of service for time sensitive applications.

To support such WTSN operations, it may be beneficial to redesign the MAC layer and physical layer (PHY) to improve efficiency and performance without needing to consider legacy behaviors or support backward compatibility while being able to coexist with legacy devices. A greenfield mode may refer to a device that assumes that there are no legacy (e.g., operating under previous protocol rules) stations (STAs) using the same channel. Thus, a device operating with a greenfield mode may operate under an assumption that all other STAs follow the same (e.g., newest) protocols, and that no legacy STAs are competing for the same channel access. In some embodiments, an STA operating with a greenfield mode may at least assume that any legacy STAs that may exist may be managed to operate in a separate channel and/or time. However, operations with multiple access points (APs) may experience interference, latency, and/or other performance issues. For example, APs may not all be aware of what other APs and STAs may be doing. Therefore, it may be desirable to define a greenfield Wi-Fi operation in a 6-7 GHz band or another frequency band, and thereby enable a time synchronized scheduled access mode for multiple APs in the 6-7 GHz band or other existing frequency bands (e.g., 2.4 GHz, 5 GHz) of future Wi-Fi generations.

The design of a greenfield air interface may be governed by significant reliability and latency constraints imposed by WTSN operations. It may therefore be desirable to efficiently design MAC and PHY communications to support WTSN applications. Legacy MAC/PHY operations may be asynchronous and may apply contention-based channel access and may require significant overhead for backward compatibility that may be important for devices to coexist in unlicensed frequency bands. Such legacy MAC/PHY operations may be too inefficient to support time sensitive applications, especially as such traffic increases, but they may still be used for non-time sensitive data or control traffic (e.g. in a legacy control channel).

While contention-free channel access mechanisms exist (e.g., point coordination function, hybrid coordination function controlled channel access), such mechanisms may lack the predictability required to support WTSN operations, as the mechanisms may be stacked on a distributed coordination function and may use polling operations with significant overhead and other inefficient steps.

Device synchronization may use transmissions with significant overhead. For example, PHY headers may be included in some or all transmissions between devices. For example, data frames and acknowledgement (ACK) frames may use legacy preambles that make the frames longer, reducing the number of transmissions that may be accomplished during a transmission opportunity (TXOP). Synchronization that occurs up front (e.g., at the start of a TXOP) may allow for reduced overhead in subsequent transmissions, and therefore may reduce the resources required for some transmissions and may allow for more throughput and lower latency in a channel.

Example embodiments of the present disclosure relate to systems, methods, and devices for enhanced time sensitive networking for wireless communications. In some embodiments, time sensitive control and data channel operations may be enabled for IEEE 802.11 standards, including for future generations of IEEE 802.11 standards (e.g., beyond IEEE 802.11ax, including 6-7 GHz communication bands, and/or in deployments in which it may be feasible to enable channel/band steering of an STA with time sensitive requirements, such as in managed private networks.

In some embodiments, control information may be updated (e.g., using scheduling) without interfering with time sensitive data, ensuring latency and reliability guarantees. For example, a time sensitive data transmission may be needed, and control information such as transmission schedules may also need to be updated to facilitate subsequent transmission. The control information updates may be sent and implemented without interfering with the time sensitive data transmissions.

In some embodiments, a time sensitive control channel (TSCCH) may be defined by combining two approaches: a periodic approach and an on-demand approach. The period approach may include predefined control slots. In the on-demand approach, an AP may define control slots as needed. A TSCCH access mechanism may use contention-based or time synchronized scheduled access procedures. Also, a wake-up signal may be used to allow delivery of time sensitive control/management information to STAs across a network, reducing latency and allowing power save modes for the STAs.

In some embodiments, a TSCCH may be in a different physical/logical channel from a data transmission. For example, a data transmission may use a data channel (e.g., in a 6-7 GHz band) while TSCCH may use separate control channel in another band (e.g., 2.4 GHz or 5 GHz).

In some embodiments, use of a TSCCH operation and access mechanism may allow improved flexibility and more deterministic opportunities for an AP to provide timely updates (e.g., schedules and control parameters) needed to manage latency and reliability, which may be beneficial in supporting time sensitive applications.

In some embodiments, a greenfield operation deployed in existing or new frequency bands (e.g., 6-7 GHz) and other managed networks may facilitate improved management of Wi-Fi networks operating in scheduled modes with time sensitive operations.

In some embodiments, it may be assumed that a Wi-Fi network may be managed and that there are no unmanaged nearby Wi-Fi STAs or networks. This assumption may be reasonable for time sensitive applications.

In some embodiments, it may be assumed that APs and STAs may synchronize their clocks to a master reference time. For example, STAs may synchronize to beacons and/or may use time synchronization protocols (e.g., as defined by the IEEE 802.1AS standard or other synchronization capabilities defined in the 802.11 standard).

In one or embodiments, it may be assumed that an AP may define a time-synchronized scheduled mode. In some embodiments, a greenfield mode may apply to a 6-7 GHz frequency band, and the greenfield mode may apply to other bands (e.g., 2.4 GHz, 5 GHz) where support for legacy devices may not be required (e.g., in some private networks). A greenfield mode may be applied according to the following principles.

In some embodiments, a fully synchronized and scheduled operation may be defined for a self-contained/synchronized transmission opportunity (S-TXOP) that may include a series of both uplink and downlink transmissions. During an S-TXOP, an AP may maintain control of a medium and may schedule access across predefined deterministic time boundaries. The use of an S-TXOP may maximize an amount of TSN traffic served while providing latency and reliability guarantees that support time sensitive operations with high efficiency.

In some embodiments, communication overheads related to synchronization, channel measurement and feedback, scheduling, and resource allocation may be intelligently packed at the beginning of an S-TXOP and may allow subsequent data transmissions to be extremely lightweight with minimal overhead. For example, up-front synchronization may allow for devices to be configured so that the devices do not need as much information as is currently provided in legacy headers. Instead, headers may be shorter because an S-TXOP has been coordinated among devices. The reduced overhead may allow for more TSN traffic to be served while providing sufficient latency and reliability of transmissions.

In some embodiments, there may be flexibility to define deterministic communication boundaries within an S-TXOP to accommodate applications requiring latency bounds in a sub-millisecond range, or other tight time ranges, for example.

In some embodiments, a multi-band framework may be leveraged to allow backward compatibility and coexistence with legacy Wi-Fi applications. A new greenfield mode as defined herein may be used for data communications, and minimal control may be required to sustain target latency, reliability, and throughput performance. Legacy modes and bands may be used to perform basic/long-term control and management tasks (e.g., non-time sensitive tasks) as well as time sensitive tasks.

In some embodiments, to reduce overhead for coexistence, a first transmission in an S-TXOP may include a legacy preamble to enable coexistence with legacy devices.

In some embodiments, enhanced time sensitive networking may improve performance over some existing wireless communications. For example, efficiency and latency may be improved, and the enhanced time sensitive networking may support a larger number of STAs for a given wireless resource while meeting latency bounds for TSN applications. (e.g., augmented virtual reality, industrial control, and autonomous systems). Enhanced time sensitive networking may allow coexistence with legacy Wi-Fi operations by leveraging multi-band devices. Coexistence across networks operating in a greenfield mode as defined herein may be allowed by having better management and coordination across basic service sets (BSSs), which may be facilitated by higher layer management/coordination protocols.

In some embodiments, a number of assumptions may be used for the greenfield mode of enhanced time sensitive networking. In some embodiments, WTSN STAs may be multi-band devices in which the MAC/PHY may operate in a different band (e.g., 6-7 GHz) than the band of a legacy STA, which may operate in 2.4 GHz or 5 GHz bands.

In some embodiments, a fully managed Wi-Fi deployment scenario in which other radio technology (e.g., legacy Wi-Fi or cellular) may not be expected to operate in a same band where a WTSN STA may be operating. In some embodiments, the enhanced time sensitive networking may be used in an indoor operating environment with relatively low mobility.

In some embodiments, a packet belonging to a TSN-grade application when queued at a WTSN STA may be dropped at a transmitter side if the packet does not get into air within a certain latency bound time.

The above descriptions are for purposes of illustration and are not meant to be limiting. Numerous other examples, configurations, processes, etc., may exist, some of which are described in detail below. Example embodiments will now be described with reference to the accompanying figures.

FIG. 1A is a diagram illustrating an example network environment, in accordance with some embodiments. Wireless network 100 may include one or more user devices 120 and one or more access point(s) (APs) 102, which may communicate in accordance with and compliant with various communication standards and protocols, such as, Wi-Fi, TSN, Wireless USB, P2P, Bluetooth, NFC, or any other communication standard. The user device(s) 120 may be mobile devices that are non-stationary (e.g., not having fixed locations) or may be stationary devices.

Figure 9:
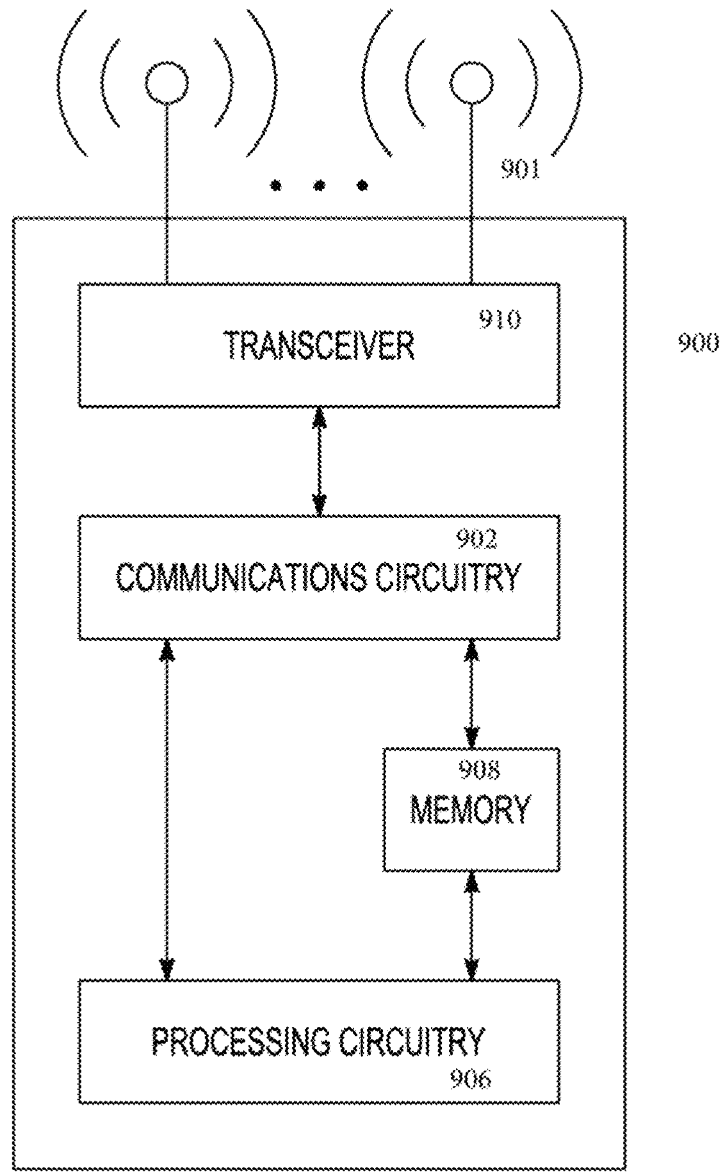
FIG. 9 illustrates a functional block diagram of a wireless communication device, in accordance with some embodiments.

In some embodiments, the user devices 120 and AP 102 may include one or more computer systems similar to that of the functional diagram of FIG. 9. One or more illustrative user device(s) 120 and/or AP 102 may be operable by one or more user(s) 108. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a robotic device, an actuator, a robotic arm, an industrial robotic device, a programmable logic controller (PLC), a safety controller and monitoring device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128, 130, and 132), and AP 102 may be configured to communicate with each other via one or more communications networks 135 and/or 140 wirelessly or wired. The user device(s) 120 may also communicate peer-to-peer or directly with each other with or without the AP 102. Any of the communications networks 135 and/or 140 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 135 and/or 140 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 135 and/or 140 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128, 130, and 132) and AP 102 may include one or more communications antennas. The one or more communications antennas may be any suitable type of antennas corresponding to the communications protocols used by the user device(s) 120 (e.g., user devices 124, 126, 128, 130, and 132), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128, 130, and 132), and AP 102 may be configured to perform directional transmission and/or directional reception in conjunction with wirelessly communicating in a wireless network. Any of the user device(s) 120 (e.g., user devices 124, 126, 128, 130, and 132), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128, 130, and 132), and AP 102 may be configured to perform any given directional transmission towards one or more defined transmit sectors. Any of the user device(s) 120 (e.g., user devices 124, 126, 128, 130, and 132), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128, 130, and 132), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more communication standards and protocols, such as, Wi-Fi, TSN, Wireless USB, Wi-Fi P2P, Bluetooth, NFC, or any other communication standard. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, 128, 130 and/or 132), the AP 102 may communicate in a downlink direction and the user devices 120 may communicate with the AP 102 in an uplink direction by sending frames in either direction. The user devices 120 may also communicate peer-to-peer or directly with each other with or without the AP 102. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

In some embodiments, and with reference to FIG. 1A, an AP 102 may communicate with user devices 120. The user devices 120 may include one or more wireless devices (e.g., user devices 124, 132) and one or more wireless TSN devices (e.g., user devices 126 128, 130). The user devices may access a channel in accordance with medium access control (MAC) protocol rules or any other access rules (e.g., Wi-Fi, Bluetooth, NFC, etc.). It should be noted that reserving a dedicated TSN channel and controlling access to it may also be applicable to cellular systems/3GPP networks, such as LTE, 5G, or any other wireless networks. The wireless TSN devices may also access a channel according to the same or modified protocol rules. However, the AP 102 may dedicate certain channels or sub-channels for TSN applications that may be needed by the one or more wireless TSN devices (e.g., user devices 126, 128, and 130), and may allocate other channels or sub-channels for the non-TSN devices (e.g., user devices 124 and 132).

In some embodiments, AP 102 may also define one or more access rules associated with the dedicated channels. A channel may be dedicated for TSN transmissions, TSN applications, and TSN devices. For example, user device 126 may access a dedicated TSN channel for TSN transmissions. TSN transmissions may include transmissions that have very low transmission latency and high availability requirements. Further, the TSN transmissions may include synchronous TSN data flows between sensors, actuators, controllers, robots, in a closed loop control system. The TSN transmissions require reliable and deterministic communications. A channel may be accessed by the user device 126 for a number of TSN message flows and is not limited to only one TSN message flow. The TSN message flows may depend on the type of application messages that are being transmitted between the AP 102 and the user device 126.

In some embodiments, while frequency planning and channel management may be used to allow AP 102 to collaborate with neighboring APs (not shown) to operate in different channels, the efficiency and feasibility of reserving multiple non-overlapping data channels for time sensitive applications may be improved. It may be desirable to limit the amount of resources reserved for time sensitive data through efficient channel reuse. If multiple devices (e.g., user devices 124, 126, 128, 130, 132) share a dedicated channel for time sensitive data transmissions, interference among multiple transmissions may be reduced with enhanced coordination between the devices and one or more APs (e.g., AP 102). For example, overlap and interference of control transmissions (e.g., a beacon), downlink data transmissions, and uplink data transmissions may be reduced with enhanced coordination. Such enhanced coordination for multiple APs may enable more efficient channel usage while also meeting latency and reliability requirements of time sensitive applications. For example, if control transmissions are not received and interpreted properly, time sensitive operations may not be scheduled properly, and/or may interfere with other transmissions, possibly causing operational errors.

In some embodiments, AP 102 may include WTSN controller functionality (e.g., a wireless TSN controller capability), which may facilitate enhanced coordination among multiple devices (e.g., user devices 124, 126, 128, 130, 132). AP 102 may be responsible for configuring and scheduling time sensitive control and data operations across the devices. A wireless TSN (WTSN) management protocol may be used to facilitate enhanced coordination between the devices, which may be referred to as WTSN management clients in such context. AP 102 may enable device admission control (e.g., control over admitting devices to a WTSN), joint scheduling, network measurements, and other operations.

In some embodiments, AP 102's use of WTSN controller functionality may facilitate AP synchronization and alignment for control and data transmissions to ensure latency with high reliability for time sensitive applications on a shared time sensitive data channel, while enabling coexistence with non-time sensitive traffic in the same network.

In some embodiments, AP 102 and its WTSN coordination may be adopted in future Wi-Fi standards for new bands (e.g., 6-7 GHz), in which additional requirements of time synchronization and scheduled operations may be used. Such application of the WTSN controller functionality may be used in managed Wi-Fi deployments (e.g., enterprise, industrial, managed home networks, etc.) in which time sensitive traffic may be steered to a dedicated channel in existing bands as well as new bands.

In some embodiments, it may be assumed that a Wi-Fi network may be managed, and that there are no unmanaged Wi-Fi STAs/networks nearby.

In some embodiments, it may be assumed that APs and STAs may synchronize their clocks to a master reference times (e.g., STAs may synchronize to beacons and/or may use time synchronization protocols as defined in the IEEE 802.1AS standard).

In some embodiments, it may be assumed that APs and STAs may operate according to a time synchronized scheduled mode that may also apply to new frequency bands (e.g., 6-7 GHz), for which new access protocols and requirements also may be proposed.

In some embodiments, a WTSN domain may be defined as a set of APs (e.g., AP 102) and STAs (e.g., user devices 124, 126, 128, 130, and 132) that may share dedicated wireless resources, and therefore may need to operate in close coordination, at a level of control and time sensitive data scheduling, to ensure latency and reliability guarantees. Different APs in the same network may form different WTSN domains.

In some embodiments, the WTSN management protocol may be executed over a wired (e.g., Ethernet) TSN infrastructure that may provide TSN grade time synchronization accuracy and latency guarantees. The WTSN management protocol may also be executed using wireless links (e.g., a wireless backhaul, which may include Wi-Fi or WiGig links through one or multiple hops). An Ethernet TSN interface may be replaced by a wireless interface (e.g., and 802.11 MAC and/or physical layer PHY). An operation of a second wireless interface may also be managed by AP 102 to avoid interference with an interface used for communication with time sensitive user STAs (e.g., user devices 126, 128, and 130).

In some embodiments, AP 102 may perform admission control and scheduling tasks. To complete an association procedure for an STA with time sensitive data streams (e.g., user device 130), the STA may request admission from AP 102. AP 102 may define which APs may be in a WTSN domain and may determine the admission of new time sensitive data streams based on, for example, available resources and user requirements. AP 102 may create and/or update a transmission schedule that may include time sensitive operations and/or non-time sensitive operations, and the schedule may be provided to admitted user devices. AP 102 may be responsible for executing the schedule according to time sensitive protocols defined, for example, at 802.11 MAC/PHY layers.

In some embodiments, AP 102 may perform transmission schedule updates. AP 102 may update a transmission schedule for time sensitive data and may send transmission schedule updates to STAs and/or other APs during network operation. A transmission schedule update may be triggered by changes in wireless channel conditions at different APs and/or STAs within a common WTSN domain. The condition changes may include increased interference, new user traffic requests, and other network and/or operational changes that may affect a WTSN domain.

In some embodiments, AP 102 may collect measurement data from other devices in a WTSN domain. The measurement data may be collected from time sensitive and/or non-time sensitive devices. AP 102 may maintain detailed network statistics, for example, related to latency, packet error rates, retransmissions, channel access delay, etc. The network statistics may be collected via measurement reports sent from STAs. AP 102 may use network statistics to proactively manage wireless channel usage to allow for a target latency requirement to be satisfied. For example, measurements may be used to determine potential channel congestion and to trigger a change from a joint transmission schedule mode to a mode in which APs may allocate a same slot to multiple non-interfering STAs that may be leveraging spatial reuse capabilities.

It is understood that the above descriptions are for purposes of illustration and are not meant to be limiting.

Figure 1B:
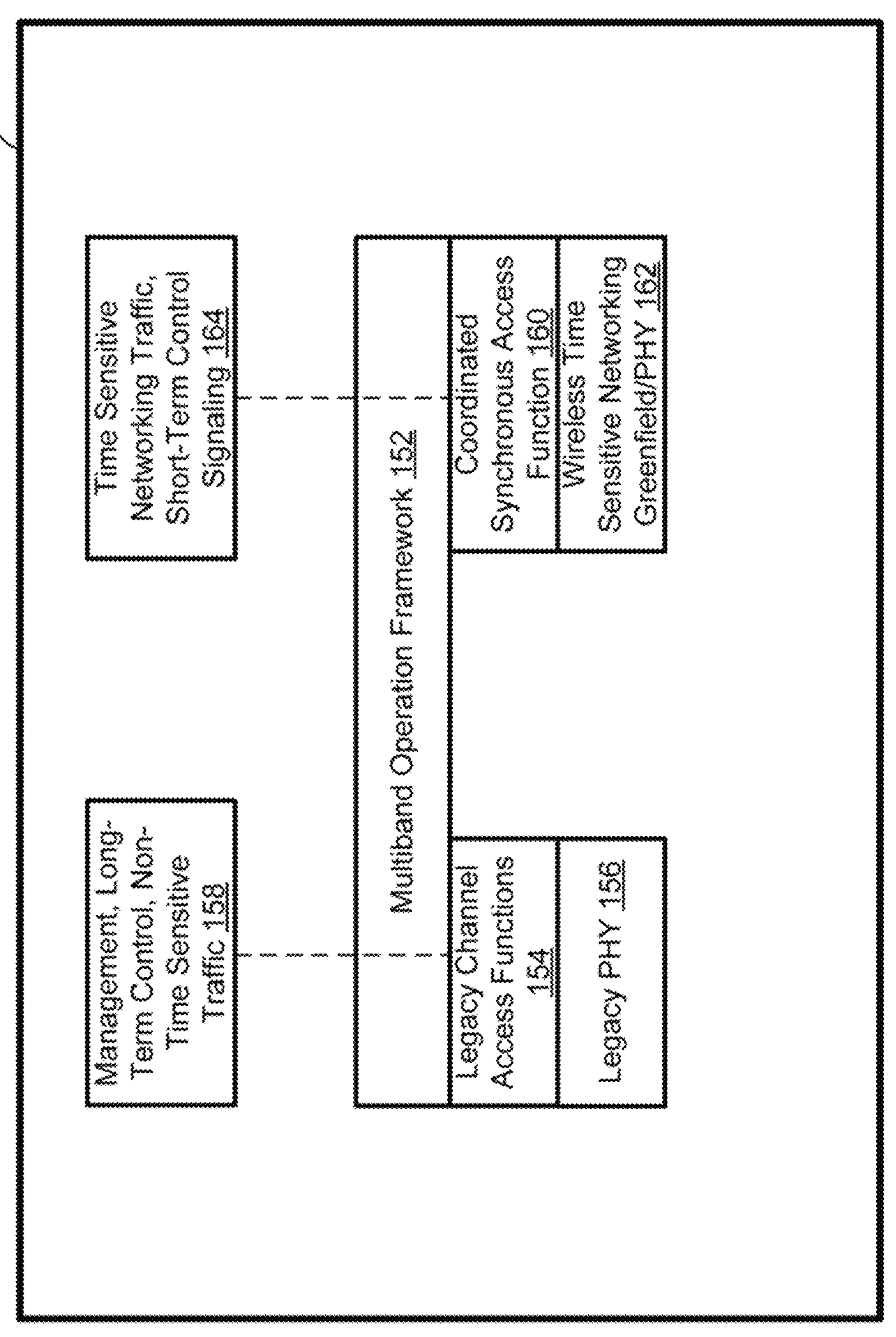
FIG. 1B illustrates an enhanced wireless time sensitive networking (WTSN) medium access control/physical layer (MAC/PHY) configuration for a WTSN device, in accordance with some embodiments.

FIG. 1B illustrates an enhanced WTSN MAC/PHY configuration for a WTSN device 150, in accordance with some embodiments.

In some embodiments, the WTSN device 150 may include a multiband operation framework 152, legacy channel access functions 154, legacy PHY 156, management, long-term control, and non-time sensitive traffic 158, coordinated synchronous access function (CSAF) 160, WTSN greenfield/PHY 162, and TSN traffic, short-term control signaling 164.

In some embodiments, the multiband operation framework 152 may allow WTSN device 150 to perform multiband operations. For example, some operations may be performed in one frequency band, while other operations may be performed in another frequency band. One frequency band may include a control channel, and another frequency band may include separate data channels.

In some embodiments, to provide for both WTSN and non-TSN operations, the WTSN device 150 may include a link for management, long-term control, and non-time sensitive traffic 158, and a link for TSN traffic and short-term control signaling 164. To support the management, long-term control, and non-time sensitive traffic 158, WTSN device 150 may include legacy channel access functions 154. Legacy channel access functions 154 may include a distributed coordination function (DCF), hybrid coordination function controlled channel access (HCF), and other channel access functions. The management, long-term control, and non-time sensitive traffic 158 may also be supported by a legacy PHY 156 (e.g., on a 2.4 GHz or 5 GHz frequency). Long-term control may include beacon transmissions, network association, security procedures, and other control traffic. Short-term control may include radio synchronization (e.g., time-frequency synchronization), scheduling, channel feedback, and other control traffic.

In some embodiments, to support the TSN traffic, short-term control signaling 164, WTSN device 150 include the CSAF 160 and the WTSN greenfield/PHY 162. The CSAF 160 may use a central coordinator at WTSN device 150 (e.g., AP 102 of FIG. 1A) to maintain a MAC/PHY level synchronization between the WTSN device 150 and non-AP STAs during an S-TXOP. The WTSN device 150 may control access to wireless media in a scheduled fashion in time, frequency, and spatial dimensions. With an infrastructure for a basic service set (BSS) for WTSN, during an S-TXOP, all WTSN STAs may need to adhere to the MAC/PHY synchronization at all times.

In some embodiments, when WTSN STAs (e.g., user device 126, user device 128, user device 130 of FIG. 1A) are not standalone devices, WTSN-capable devices may associate with a network using a legacy link (e.g., legacy channel access functions 154, legacy PHY 156, and management, long-term control, non-time sensitive traffic 158 of FIG. 1B). During association, a WTSN STA may indicate its capability and interest to join a WTSN operation mode. Through the legacy link, a multiband AP (e.g., AP 102 of FIG. 1A) may instruct the WTSN-capable STA to configure the WTSN STA's MAC/PHY on designated band. The WTSN MAC in the WTSN STA may achieve MAC/PHY synchronization and successfully read initial control and synchronization information in a synchronization and configuration frame (SCF) received from the AP in a WTSN band. Through the legacy link, the AP and STA may complete the association process by exchanging management frames. This process may be referred to as associating or establishing a channel/connection with a device.

In some embodiments, some long-term parameters and control signals related to a WTSN MAC/PHY operation may be conveyed from a WTSN AP to WTSN non-AP STAs through the legacy link.

In some embodiments, the legacy link may also be used for admission control and/or inter-BSS coordination, and the multiband operation framework 152 may be used to direct TSN traffic (e.g., TSN traffic, short-term control signaling 164) to the WTSN MAC/PHY (e.g., WTSN Greenfield/PHY 162). The WTSN MAC/PHY may provide functionality to support ultra-low and near-deterministic packet latency (e.g., one millisecond or less) with virtually no jitter in a controlled environment. Latency may be measured from a time when a logical link control (LLC) MAC service data unit (MDSU) enters a MAC sublayer at a transmitter to a time when the MDSU is successfully delivered from the MAC sublayer to an LLC sublayer on a receiver.

In some embodiments, WTSN operations may be facilitated by a synchronous and coordinated MAC/PHY operation during an S-TXOP between a WTSN AP and one or more non-AP WTSN STAs in a BSS infrastructure.

It is understood that the above descriptions are for purposes of illustration and are not meant to be limiting.

Figure 2:
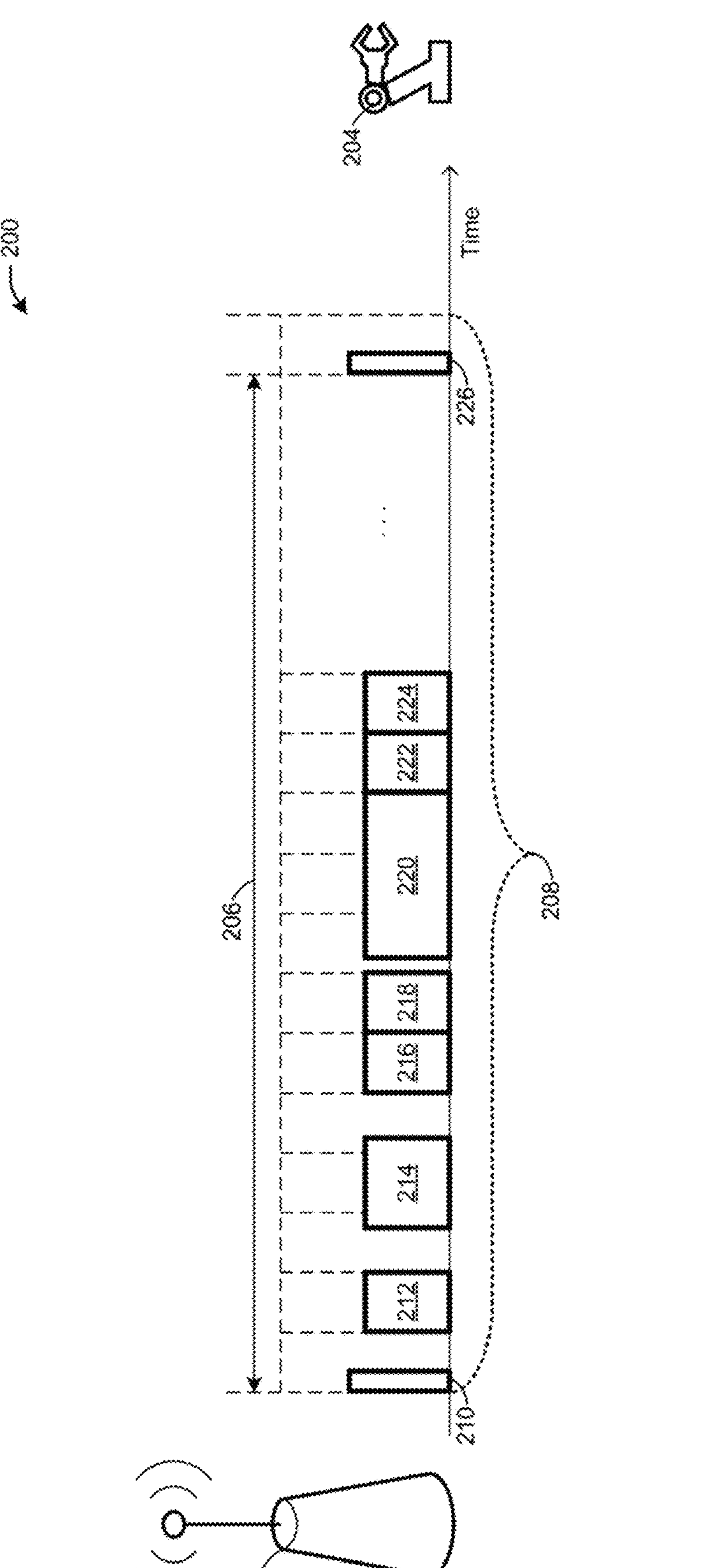
FIG. 2 illustrates a timing diagram of an enhanced WTSN time synchronization, in accordance with some embodiments.

FIG. 2 illustrates an timing diagram 200 of an enhanced WTSN time synchronization, in accordance with some embodiments. Referring to FIG. 2, there is shown uplink and downlink data frame flows between AP 202 and a TSN device 204. For example, TSN device 204 may receive downlink data frames from AP 202 and may send uplink data frames to AP 202. In one embodiment, the WTSN time synchronization may be utilized for persistent scheduling for synchronous transmission from TSN device 204 to AP 202.

In some embodiments, during a beacon period 206 (e.g., 100× cycle time), AP 202 may transmit or receive during one or more service periods 208 that comprise the beacon period 206. For example, service periods 208 may span 1 millisecond or some other time during which one or more transmissions may be made. A cycle time is a parameter that may be configured based on a service and/or latency requirements of one or more applications. For example, an STA application may generate packets in a synchronous/periodic pattern (e.g., of 1 millisecond cycles), and packets generated at the beginning of a cycle may need to be delivered within the cycle.

In some embodiments, AP 202 may send a control frame, such as a beacon 210 during a service period 208 at the beginning of beacon period 206. During TXOP 212, TXOP 214, TXOP 216, TXOP 218, TXOP 220, TXOP 220, TXOP 222, and TXOP 224, AP 202 may send or receive frames to/from TSN device 204. At the conclusion of beacon period 206, a new beacon period may begin with AP 202 sending beacon 226. In some embodiments, the control frame may be a trigger frame. In these embodiments, the control frame may be used to initiate a sequence of multiple transmissions within a period that repeats, as further described herein.

In some embodiments, any of TXOP 212, TXOP 214, TXOP 216, TXOP 218, TXOP 220, TXOP 220, TXOP 222, and TXOP 224 may include restricted or unrestricted service periods, time sensitive service periods, or non-time sensitive service periods. TXOP 212, TXOP 214, TXOP 216, TXOP 218, TXOP 220, TXOP 220, TXOP 222, and TXOP 224 may comprise one or more service periods 208.

It is understood that the above descriptions are for purposes of illustration and are not meant to be limiting.

Figure 3A:
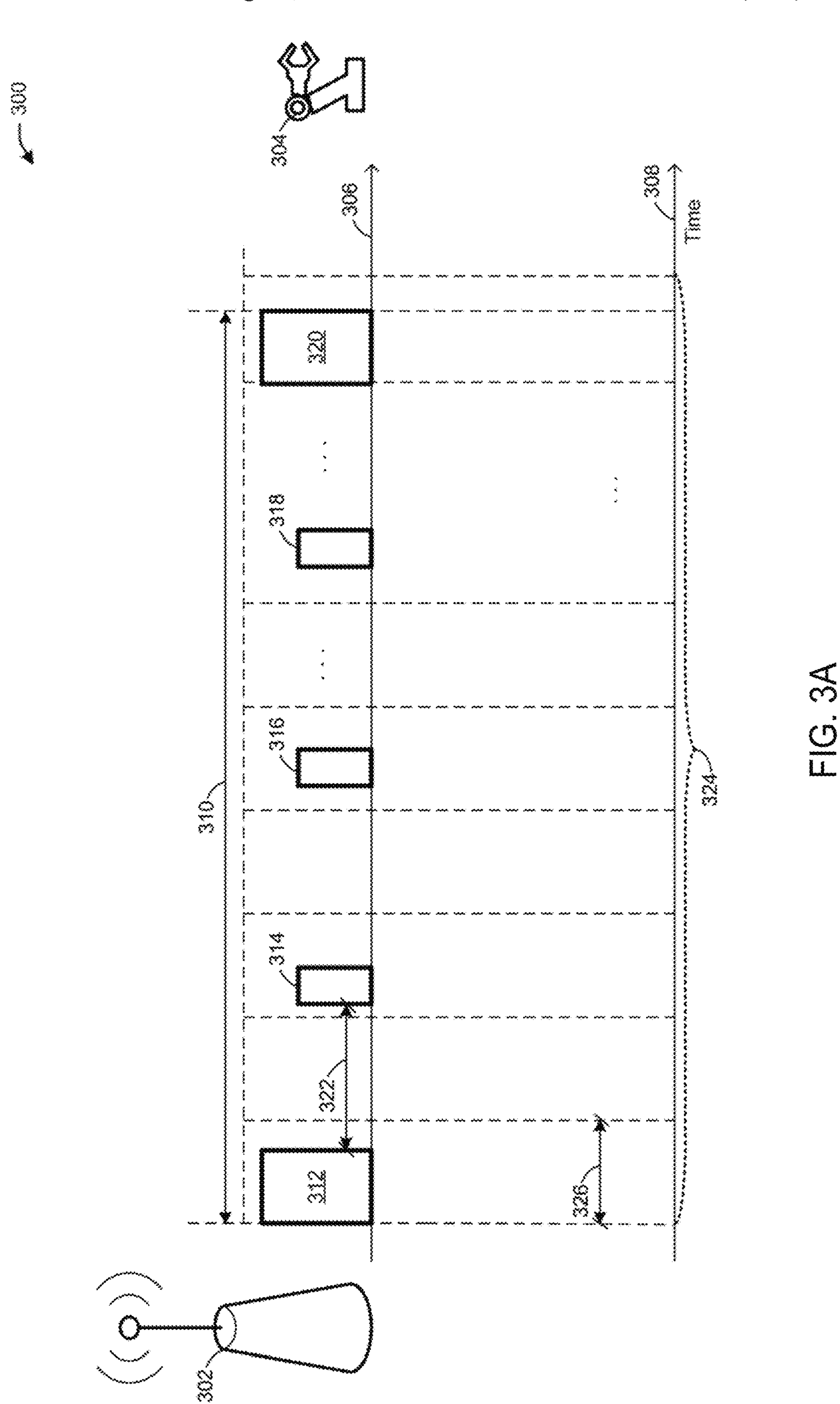
FIG. 3A illustrates a control channel access sequence, in accordance with some embodiments.

FIG. 3A illustrates an control channel access sequence 300, in accordance with some embodiments. In some embodiments, AP 302 may be a WTSN device (e.g., WTSN device 150 of FIG. 1B) in communication with STA 304, which may be another WTSN device. AP 302 and STA 304 may use a TSCCH 306 and a TSDCH 308 to transmit both control/management frames and data frames.

In some embodiments, a beacon period 310 (e.g., 100× cycle time) may begin with AP 302 sending beacon 312. Later in beacon period 310, AP 302 may send short beacon 314, short beacon 316, short beacon 318, or any number of short beacons supported by the beacon period 310. At the end of beacon period 310, another beacon 320 may be sent by AP 302. Beacon 312, short beacon 314, short beacon 316, short beacon 318, and/or beacon 320 may provide control/management frames to STA 304 in TSCCH 306.

In some embodiments, TSCCH 306 and TSDCH 308 may be divided into cycles 324 which may span a cycle time 326 (e.g., 1 ms). Beacon 312, short beacon 314, short beacon 316, short beacon 318, and/or beacon 320 may not require an entire cycle 324.

In some embodiments, TSCCH 306 and TSDCH 308 may be logical channels defined within an existing or new physical channel/frequency band. TSCCH 306 may be defined within a primary channel, while TSDCH 308 may be defined in a secondary or dedicated TS channel, possibly in another frequency band. TSCCH 306 may be used for time sensitive access under control of AP 302. TSDCH 308 may be defined in an existing or new band (e.g., 6-7 GHz).

In some embodiments, configurations for TSCCH 306 and/or TSDCH 308 may be transmitted as information elements in beacon 312, short beacon 314, short beacon 316, short beacon 318, and/or beacon 320. The configurations may provide information identifying the corresponding physical channels used for TSCCH 306 and TSDCH 308.

In some embodiments, TSCCH 306 may be defined as periodic resources (e.g., time-frequency slots) for exchanging control frames. Defining a periodic interval for control frames may be important to enable time sensitive STAs (e.g., STA 304) to schedule time sensitive data and control actions without conflicts (e.g., conflicts with other devices).

In some embodiments, TSCCH 306 may be used to transmit regular beacons (e.g., beacon 312, beacon 320) and short beacons (e.g., short beacon 314, short beacon 316, short beacon 318), which may include a subset of information transmitted of regular beacons (e.g., an updated transmission schedule or bitmap of restricted time sensitive service periods). Short beacon transmissions may be scheduled in predefined intervals (e.g., fractions of beacon period 310). Other management frames may also be transmitted in TSCCH 306, such as association request/response frames, timing measurements, and channel feedback measurement frames.

In some embodiments, access to TSCCH 306 may use contention-based TSN sequence 300. Contention-based TSN sequence 300 may follow a legacy carrier-sense multiple access (CSMA)-based IEEE 802.11 MAC protocol. For example, when TSCCH 306 is defined as the operating/primary channel, AP 302 may contend for TSCCH 306 using enhanced distributed channel access (EDCA) to transmit beacon (e.g., beacon 312, beacon 320) and short beacons (e.g., short beacon 314, short beacon 316, short beacon 318) at predefined intervals. TSCCH control frames (e.g., beacon 312, short beacon 314, short beacon 316, short beacon 318, and/or beacon 320) may include information to support a time synchronized scheduled access in TSDCH 308. Such operation may enable time sensitive operations for legacy Wi-Fi systems in which TSCCH 306 may provide an anchor for TSDCH 308 (e.g., time synchronized and schedule) in one or more restricted channels and/or frequency bands.

In some embodiments, access to TSCCH 306 may use a time-synchronized access method. TSCCH 306 may be defined as periodic scheduled resources (e.g., time slots) for regular beacons (e.g., beacon 312, beacon 320) and short beacons (e.g., short beacon 314, short beacon 316, short beacon 318) using time-synchronized access. Access to time slots (e.g., cycles 324) may still be based on contention (e.g., CSMA) or may be scheduled. For example, slots may be reserved for beacons and short beacons, which may be transmitted periodically (e.g., every fifth slot). TSCCH 306 may also be aligned with TSDCH 308 timing. TSCCH time slots reserved for beacons and/or short beacons may be announced in regular beacons so that newly admitted STAs (e.g., STA 304) may discover TSCCH 306 parameters. All STAs may be required to adhere to time synchronization across channels and ensure TXOPs do not overlap with scheduled TSCCH slots. In addition, all STAs may be required to listen to TSCCH 306 during scheduled beacon/short beacon slots to make sure the STAs receive those beacons/short beacons. Such operation may provide a more deterministic operation as timing of each TSCCH 306 may be controlled and collisions may be avoided through efficient scheduling.

In some embodiments, remaining time of TSCCH slots (e.g., cycles 324) occupied by a beacon/short beacon may be used to exchange other control/management frames. In some embodiments, AP 302 may transmit unicast control/management frames to STA 304 using TSDCH 308 provided that the control/management frames do not interfere with time sensitive data.

It is understood that the aforementioned example is for purposes of illustration and not meant to be limiting.

Figure 3B:
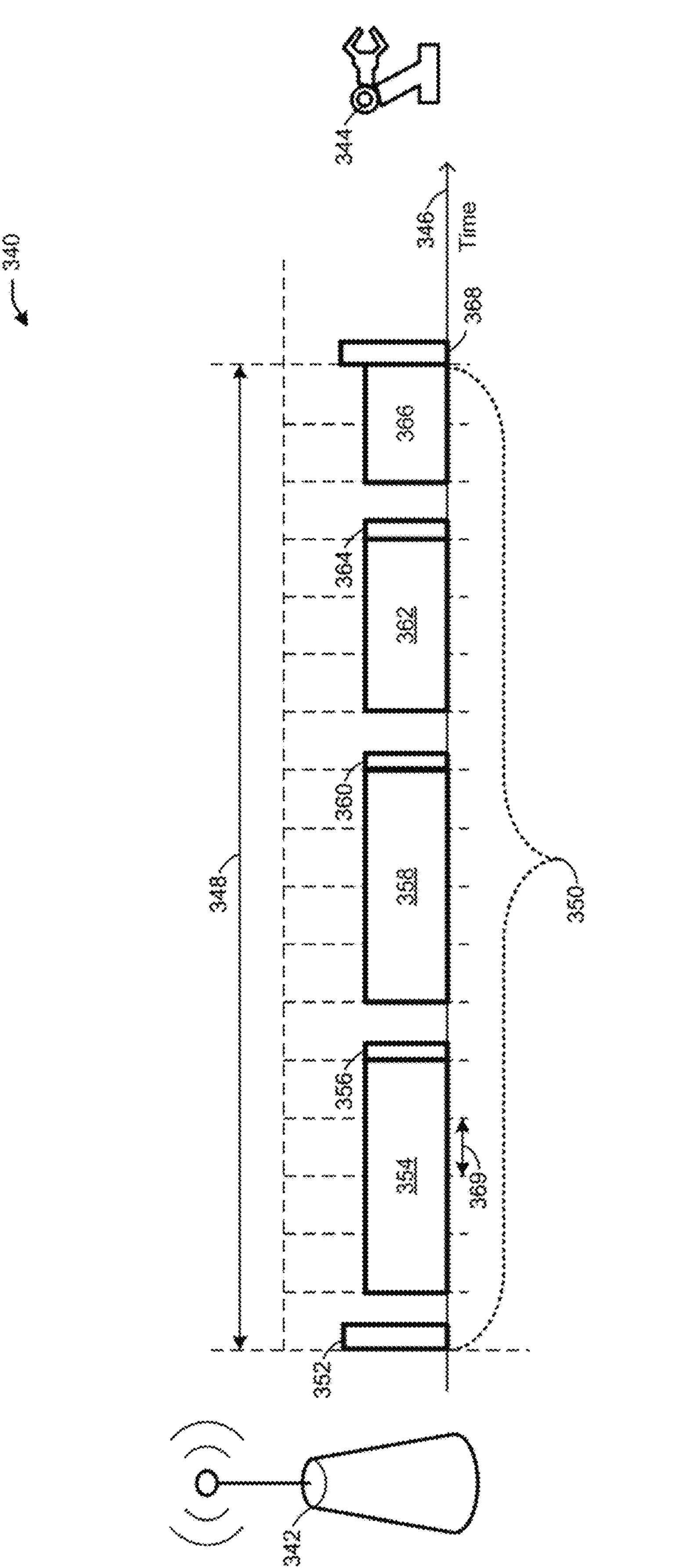
FIG. 3B illustrates a combined channel access sequence, in accordance with some embodiments.

FIG. 3B illustrates an combined channel access sequence 340, in accordance with some embodiments. In some embodiments, AP 342 may be a WTSN device (e.g., WTSN device 150 of FIG. 1B) in communication with STA 344, which may be another WTSN device. AP 342 and STA 344 may use channel 346 to transmit both control/management frames and data frames.

In some embodiments, a beacon period 348 (e.g., 100× cycle time) having one or more cycles 350 may begin with AP 342 sending beacon 352. Later in beacon period 348, AP 342 and/or STA 344 may send one or more data frames 354. AP 342 may send short beacon 356. AP 342 and/or STA 344 may send one or more data frames 358. AP 342 may send short beacon 360. AP 342 and/or STA 344 may send one or more data frames 362. AP 342 may send short beacon 364. AP 342 and/or STA 344 may send one or more data frames 366. After beacon period 348 has concluded, AP 342 may send another beacon 368 to begin another beacon period. The beacons (e.g., beacon 352, short beacon 356, short beacon 360, short beacon 364, and beacon 368) may be sent in channel 346. The one or more data frames (e.g., one or more data frames 354, one or more data frames 358, one or more data frames 362, and one or more data frames 366) may be sent in the channel 346.

In some embodiments, channel 346 may be divided into cycles 350 which may span a cycle time 369 (e.g., 1 ms). Beacon 352, short beacon 356, short beacon 360, short beacon 364, and beacon 368 may not require an entire cycle 350. The one or more data frames (e.g., one or more data frames 354, one or more data frames 358, one or more data frames 362, and one or more data frames 366) may use one or more cycles 350 and may use partial cycles 350.

In some embodiments, channel 346 may be a physical channel that includes a TSCCH and TSDCH. Using cycles 350, control/management frames (e.g., beacon 352, short beacon 356, short beacon 360, short beacon 364, and beacon 368) and data frames (e.g., one or more data frames 354, one or more data frames 358, one or more data frames 362, and one or more data frames 366) may be scheduled to avoid overlapping/conflicting transmissions. Such enhanced coordination may facilitate WTSN communications which meet the latency and reliability requirements of WTSN operations.

It is understood that the aforementioned example is for purposes of illustration and not meant to be limiting.

Figure 3C:
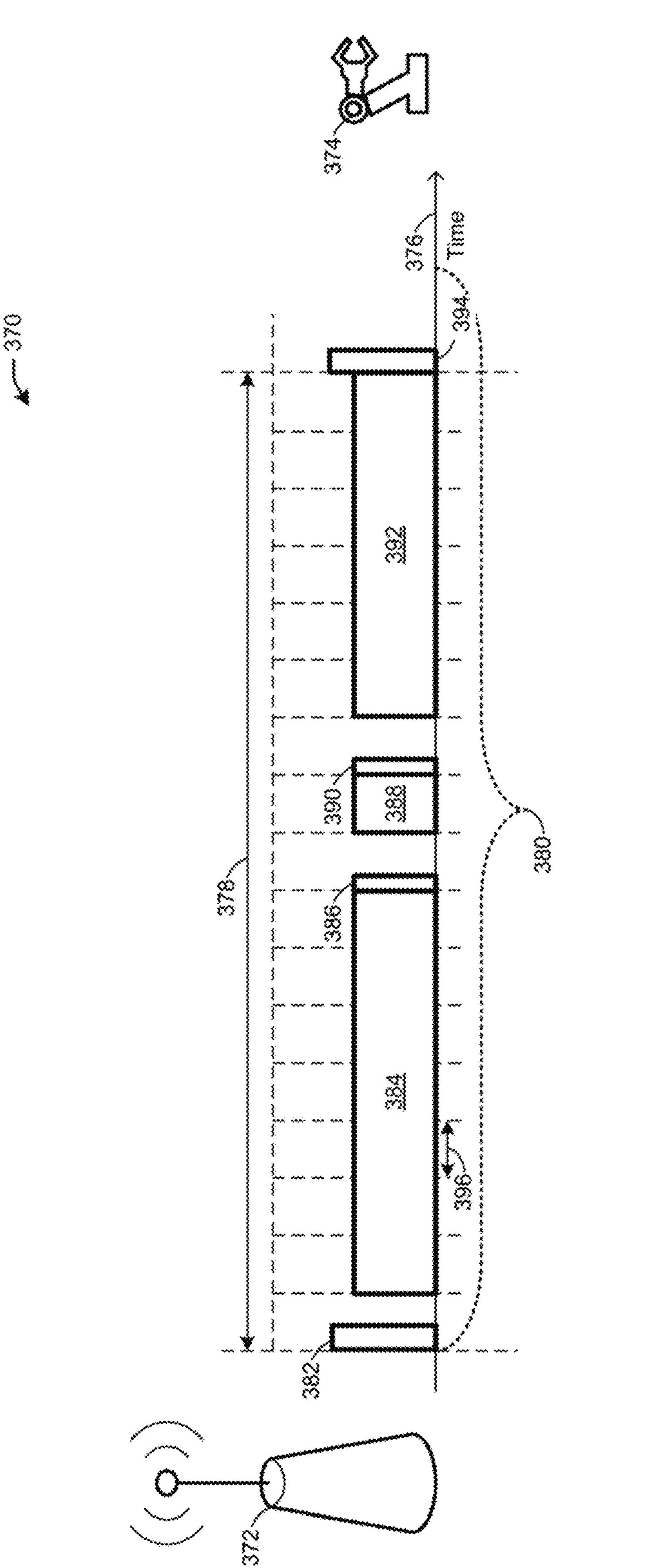
FIG. 3C illustrates an on-demand channel access sequence, in accordance with some embodiments.

FIG. 3C illustrates an on-demand channel access sequence 370, in accordance with some embodiments. In some embodiments, AP 372 may be a WTSN device (e.g., WTSN device 150 of FIG. 1B) in communication with STA 374, which may be another WTSN device. AP 372 and STA 374 may use channel 376 to transmit both control/management frames and data frames.

In some embodiments, a beacon period 378 (e.g., 100× cycle time) having one or more cycles 380 may begin with AP 372 sending beacon 382. Later in beacon period 378, AP 372 and/or STA 374 may send one or more data frames 384. AP 372 may send short beacon 386. AP 372 and/or STA 374 may send one or more data frames 388. AP 372 may send short beacon 390. AP 372 and/or STA 374 may send one or more data frames 392. After beacon period 378 has concluded, AP 372 may send another beacon 394 to begin another beacon period. The beacons (e.g., beacon 382, short beacon 386, short beacon 390, and beacon 394) may be sent in channel 376. The one or more data frames (e.g., one or more data frames 384, one or more data frames 388, and one or more data frames 392) may be sent in the channel 376.

In some embodiments, AP 372 may send control/management frames (e.g., beacon 382, short beacon 386, short beacon 390, and beacon 394) on demand using resources such as time slots (e.g., cycles 380) that may not be reserved for time sensitive data.

Figures 4A, 4B:
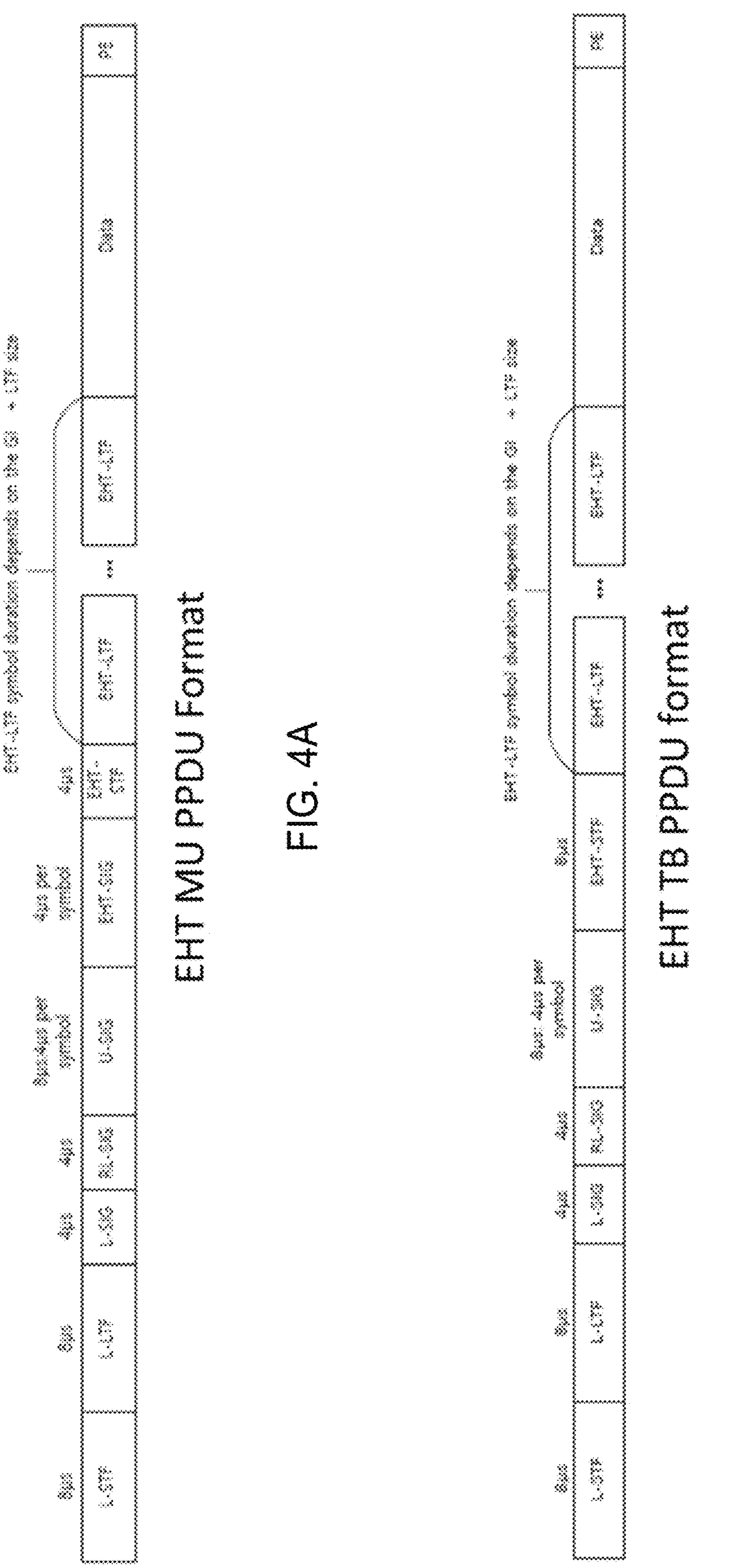
FIG. 4A illustrates an EHT MU PPDU format, in accordance with some embodiments.
FIG. 4B illustrates an EHT TB PPDU format, in accordance with some embodiments.

FIG. 4A illustrates an EHT MU PPDU format, in accordance with some embodiments. The EHT MU PPDU format used for transmission to one or more users. The PPDU is not a response to a triggering frame. In the EHT MU PPDU, the EHT-SIG field is present.

FIG. 4B illustrates an EHT TB PPDU format, in accordance with some embodiments. The EHT TB PPDU format is used for a transmission that is a response to a triggering frame from an AP. In the EHT TB PPDU, the EHT-SIG field is not present and the duration of the EHT-STF field is twice the duration of the EHT-STF field in the EHT MU PPDU.

To increase the overall throughput of Wi-Fi devices, transmit opportunity (TXOP) and frame aggregation was introduced in 802.11n and subsequent standards. This aggregation makes PPDU data payload much bigger and therefore occupies a much longer airtime.

Although frame aggregation helps improve throughput and reduce average latency for a pair of STAs, it can result in a much higher worst-case latency for a 3rd party STA waiting for the wireless medium to be idle due to a much longer airtime occupied by a long aggregated PPDU between the pair of STAs. Time-sensitive frames may experience a higher latency if the channel is occupied by a long PPDU transmission by other devices from the same BSS or overlapping BSS (OBSS).

Figures 5, 6:
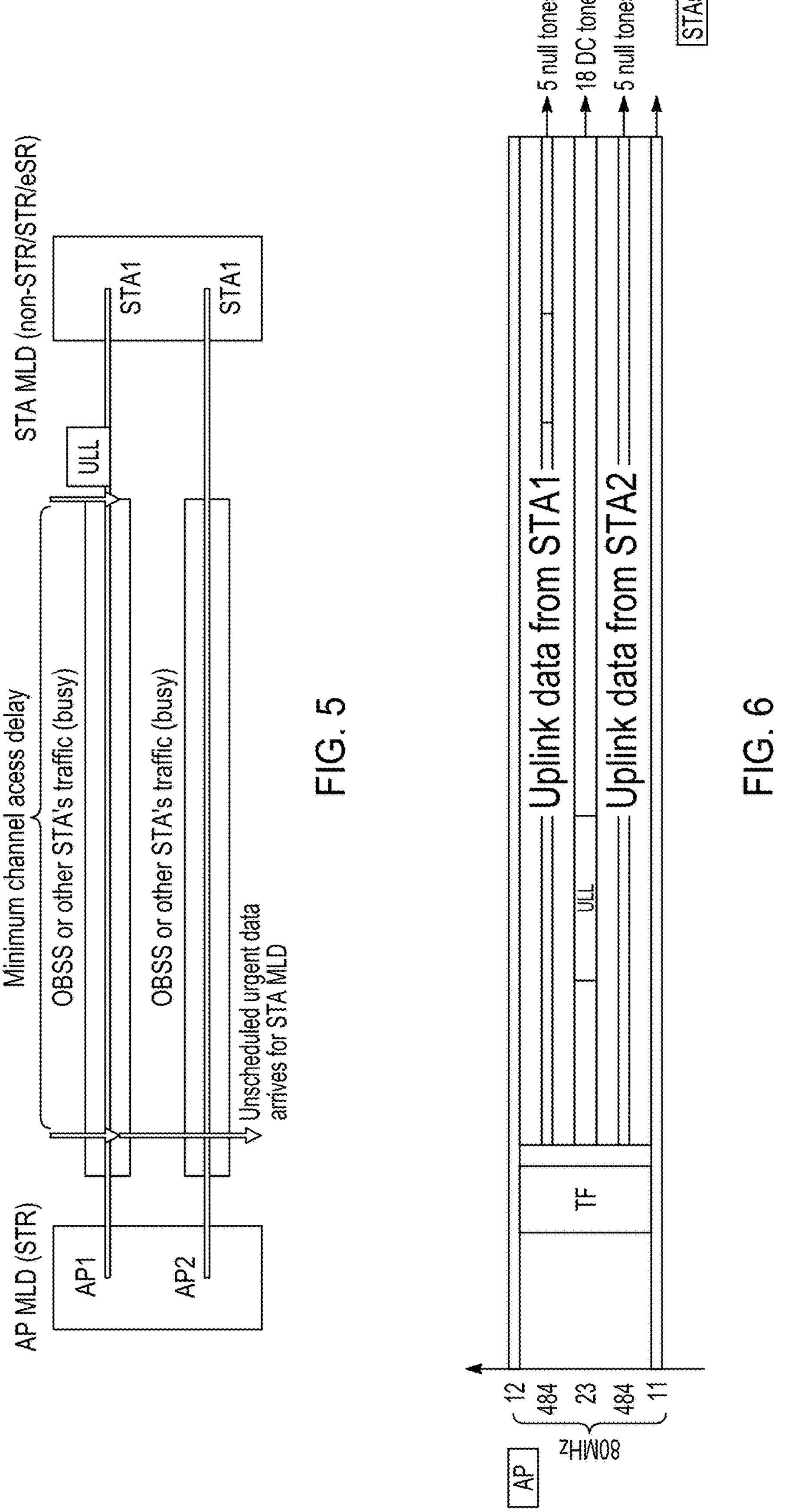
FIG. 5 illustrates channel access delay associated with simultaneous transmission and reception (STR) operations, in accordance with some embodiments.
FIG. 6 illustrates ULL transmission during an UL PPDU, in accordance with some embodiments.

With the introduction of multiple link capability in 802.11be, this problem can be mitigated if a client device supports simultaneous transmission and reception (STR) and if there is at least one link idle. However, this problem still exists if both two channels are occupied by any ongoing transmission from the same or overlapping BSS (OBSS) as shown in FIG. 5. FIG. 5 illustrates channel access delay associated with simultaneous transmission and reception (STR) operations, in accordance with some embodiments.

In some embodiments, null tones may be used for time sensitive packet transmission while the channel is occupied by a long TXOP data transmission. For the uplink case with 80 MHz channel bandwidth, the AP will schedule the null tones for ULL data transmission. This information will be indicated in the trigger frame. Upon the reception of the trigger frame, the STAs those are triggered to send normal uplink PPDU will do the normal time/frequency synchronization and send the uplink multi-user OFDMA data. For those STAs that may have ULL data to be transmitted, it will also do the time/frequency synchronization and send ULL data on the scheduled null tones. Note, the ULL may start anytime during the UL PPDU transmission from other STAs as shown in FIG. 6. FIG. 6 illustrates ULL transmission during an UL PPDU, in accordance with some embodiments.

These embodiments may be applied to a more general solution, which is to transmit the ULL packet over the dedicated RU, which can be any of existing defined RU or a new RU constructed with the null or DC tones. In some embodiments, the tone plan for the new RU may be constructed with the null or DC tones. In some embodiments, dedicated RUs may be used. Embodiments disclosed herein allocate dedicated RUs for time sensitive/low-latency traffic transmission and proposes solutions to signaling, synchronization, AGC, and packet acquisition. Some embodiments disclosed herein provide for TC ULL data communication with sub 1 millisecond latency.

Figures 7A, 7B:
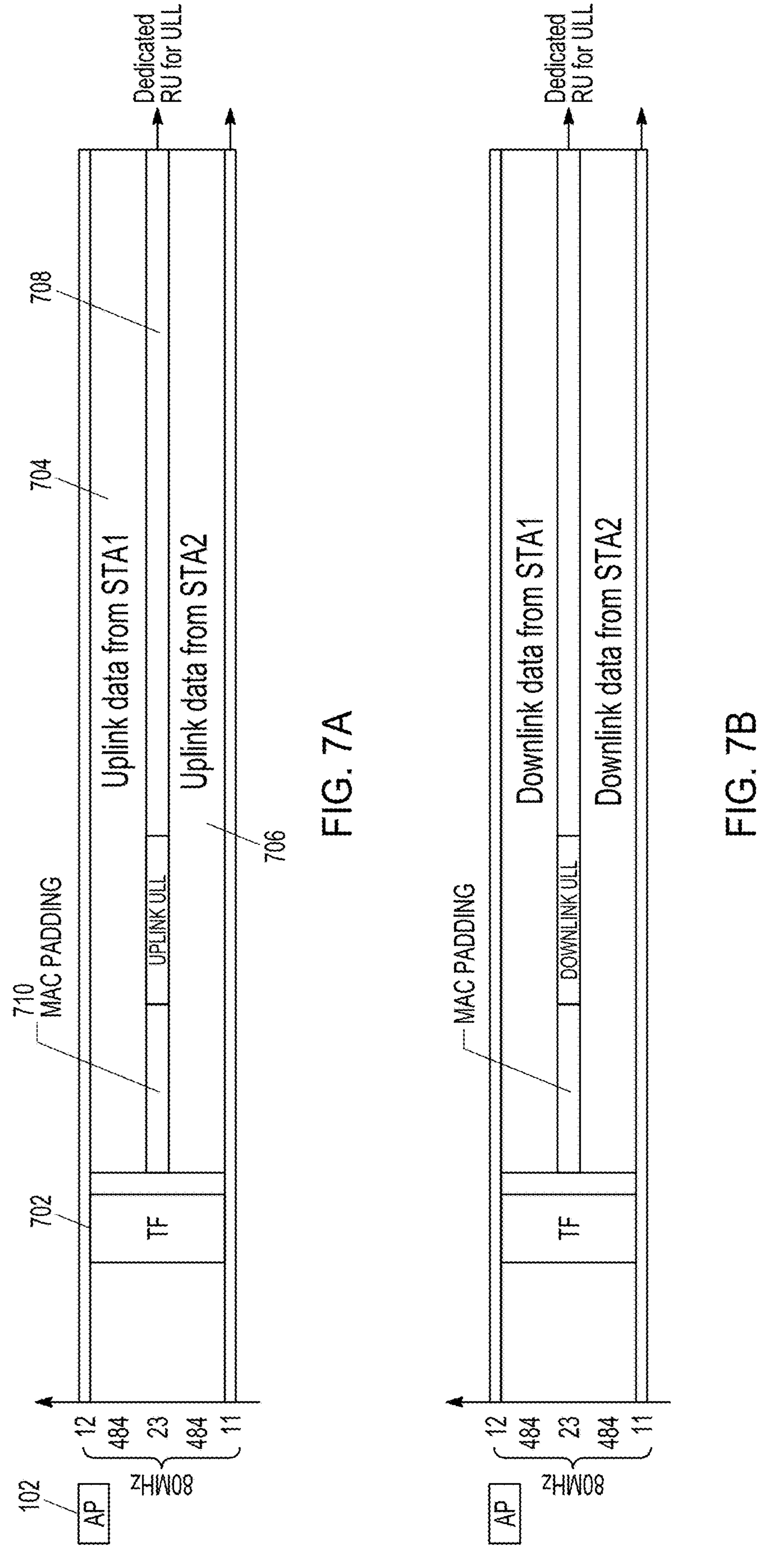
FIG. 7A illustrates an UL ULL transmission using a dedicated resource unit (RU), in accordance with some embodiments.
FIG. 7B illustrates a downlink (DL) ULL transmission using a dedicated resource unit (RU), in accordance with some embodiments.
Figure 7C:
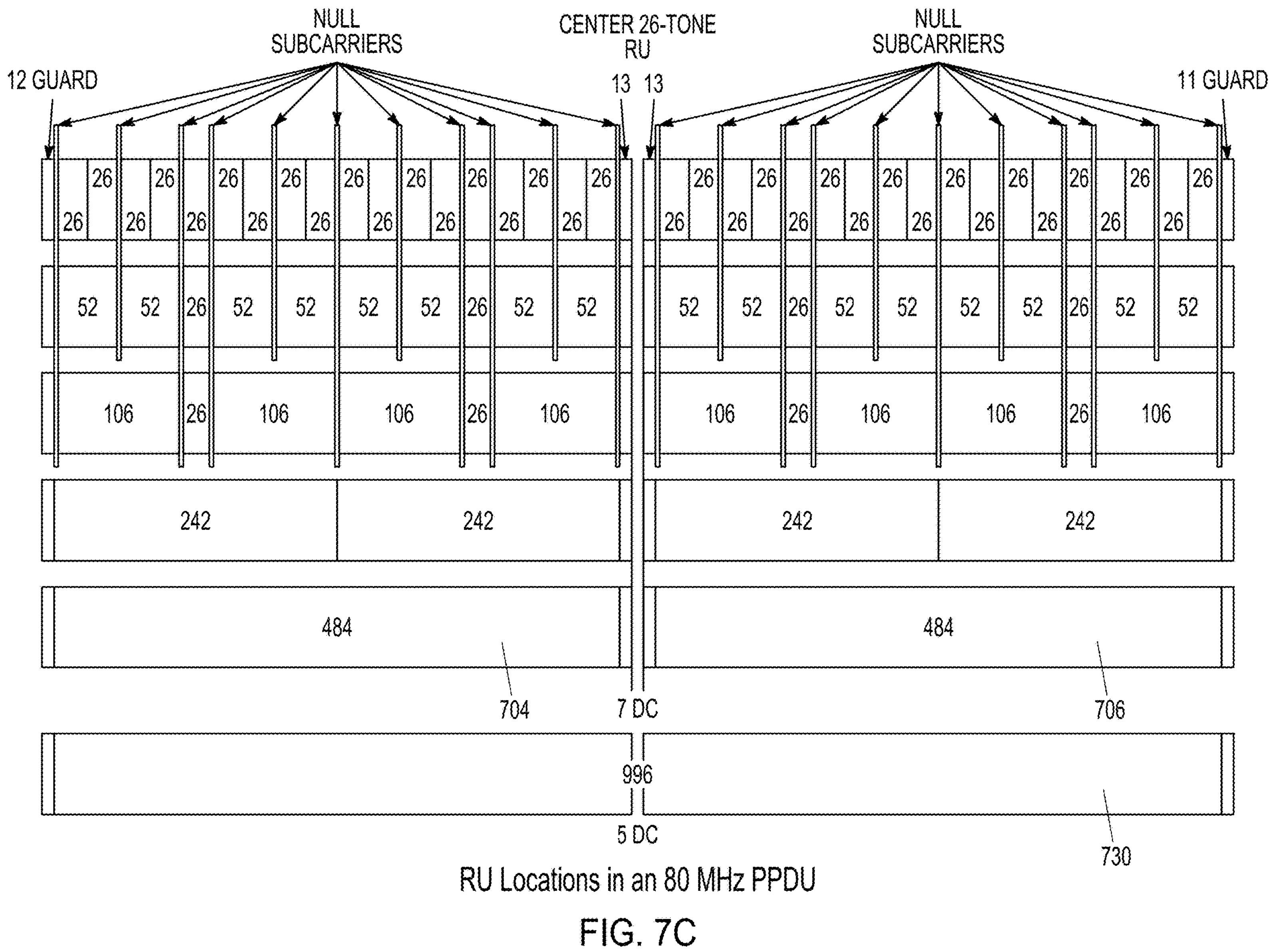
FIG. 7C. illustrates resource unit (RU) locations in an example 80 MHz PPDU, in accordance with some embodiments.

FIG. 7A illustrates an UL ULL transmission using a dedicated resource unit (RU), in accordance with some embodiments. FIG. 7B illustrates a downlink (DL) ULL transmission using a dedicated resource unit (RU), in accordance with some embodiments. FIG. 7C. illustrates resource unit (RU) locations in an example 80 MHz PPDU, in accordance with some embodiments.

Some embodiments use a dedicated RU for ULL data communication. In these embodiments, assuming that within a BSS, there is time critical traffic to be transmitted. AP will reserve one or more dedicated RUs for the time critical traffic. In the downlink, this information will be indicated in the U-SIG or EHT-SIG field, in the uplink, this information will be indicated in the trigger frame.

Figure 8:
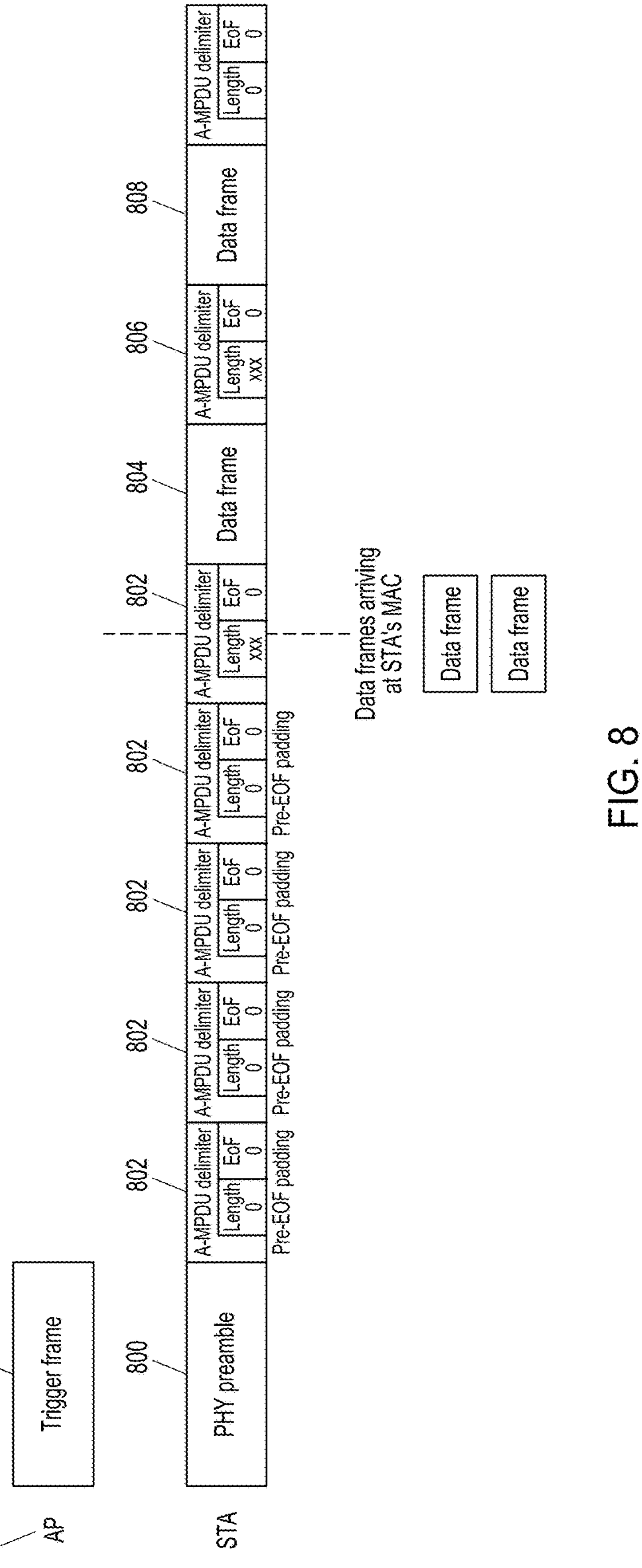
FIG. 8 illustrates data frames arriving at a STA's medium access control (MAC) layer, in accordance with some embodiments.

In the downlink case, after the AP starts the downlink MU-OFDMA data transmission, if a time critical packet arrives during the downlink MU-OFDMA data transmission, the AP can insert the time critical packet in the dedicated RU. In the uplink case, the AP may signal the availability of the dedicated RU for time-critical traffic in the trigger frame. This decision may be based on multiple factors, including but not limited to traffic requirements information from STAs, predefined configuration for a given network scenario, etc. Upon the reception of the trigger frame, the STAs that are triggered to send normal uplink PPDU will do the normal time/frequency synchronization and send the uplink MU OFDMA data. For those STAs that may have time critical data (marked as ultra low latency (ULL) (see FIG. 7A, FIG. 7B, and FIG. 8)) transmitted, they will also do the time/frequency synchronization and send ULL data on the reserved dedicated RUs indicated in the trigger frame. Note, the ULL may start anytime during the UL PPDU transmission from other STAs as shown in FIG. 7A and FIG. 7B. FIG. 8 illustrates data frames arriving at a STA's medium access control (MAC) layer, in accordance with some embodiments.

Signaling for RUs dedicated for ULL traffic: The number of dedicated RUs with their location's information and ULL STAs those are allowed to transmit or may receive ULL over the dedicated RU are scheduled by the AP. Those parameters can be indicated in the U-SIG or TF (trigger frame) such that receiver will know which RUs may carry or can be used for the low-latency transmission in the downlink and uplink.

Synchronization: In the downlink case, the AP will load the ULL data over the dedicated RU and keep orthogonal transmission among different RUs as normal data.

In the uplink case, upon the reception of the TF with the dedicated RU configuration, the ULL STAs those are allowed to transmit uplink ULL packet, it will do time and frequency domain synchronization to the AP and load the ULL data over the dedicated RU during the uplink MU-OFDMA transmission. To keep orthogonal transmission among different RUs, the uplink ULL transmission aligns the time symbol with existing UL normal data transmissions.

AGC: In the downlink case, the AP will do MAC padding over the dedicated RU for the ULL transmission while there is no ULL data for transmission, as a result the STA is able to receive downlink MU OFDMA data without AGC problem.

In the uplink case, if each dedicated RU is assigned for a single dedicated uplink ULL STA, upon the reception of the TF, the uplink ULL STA will feedback UL MU OFDMA data over the dedicated RU with MAC padding while there is no ULL data for transmission and insert the ULL data when it is available.

Embodiments disclosed herein are directed to communicating time-critical ultra-low latency (ULL) data using one or more dedicated resource units (RUs). In some embodiments, a station (STA) (i.e., STA3) may be configured to decode a trigger frame 702 received from an access point station (AP) 102 (see FIG. 7A). The trigger frame 702 may be encoded to indicate resource units (RUs) 704, 706 of an UL PPDU 730 for an uplink multi-user orthogonal frequency division multiple access (UL MU OFDMA) data transmission by a first and a second station STA (i.e., STA1 and STA2). In these embodiments, the trigger frame 702 may also be encoded to indicate configuration information for a dedicated RU 708 for time-critical ultra-low latency (ULL) UL data. In these embodiments, the dedicated RU may be one RU of one or more RUs of the UL PPDU 730 (see FIG. 7C) that are reserved for time-critical communications.

In these embodiments, the STA3 may encode the time-critical ULL UL data for transmission on the dedicated RU 708 during the uplink MU OFDMA data transmission by the first and second STAs. The time-critical ULL UL data may be configured to start at a time (i.e., any time) during transmission of the UL PPDU 730.

An example of this is illustrated in FIG. 7A, which shows the transmission of UL ULL data using a dedicated resource unit (RU) 708, in accordance with some embodiments. FIG. 7C. illustrates resource unit (RU) locations in an example 80 MHz PPDU, in accordance with some embodiments. It should be noted that the time-critical communication, transmitted by STA3 on the dedicated RU 708, may start at any time during the UL PPDU transmission. These embodiments are described in more detail below.

In some embodiments, for transmission of time-critical ULL UL data during the UL MU OFDMA data transmission, the STA3 may encode a physical layer (PHY) UL trigger-based PPDU (UL TB PPDU) 800 (see FIG. 8) for transmission on the dedicated RU by including medium access control layer (MAC) padding 710 in a MAC payload of the UL TB PPDU until the time-critical ULL UL data is available at a MAC layer of the STA (i.e., STA3) from an upper layer. In these embodiments, the MAC padding may one or more MAC Protocol Data Units (MPDUs) 802 with a length field set to zero (i.e., pre EOF padding (see FIG. 8).

In these embodiments, the UL TB PPDU 800 may also be encoded to include a data frame MPDU 804 within the MAC payload when the time-critical ULL UL data is available at the MAC layer. In these embodiments, the MAC payload of the data frame MPDU may comprise the time-critical ULL UL data and having a length field set to a non-zero value. As shown in FIG. 7A, STA3 transmits MAC padding during the UL MU OFDMA data transmission by STA1 and STA2 until the time-critical data is available at the MAC layer and ready to send as a data frame.

In some embodiments, the STA 3 may further be configured to include additional MAC padding 806 after the data frame MPDU 804. In these embodiments, when additional time-critical ULL UL data is available during the UL MU OFDMA data transmission, the STA 3 may encode a second data frame MPDU 808 within the MAC payload that includes the additional time-critical ULL UL data. In these embodiments, the second data frame MPDU 808 may be transmitted after the additional MAC padding 806.

In some embodiments, the time-critical ULL UL data may have a latency requirement (e.g., of less than 100 microseconds and in some cases, in 10 s of microseconds or less) (i.e., much less than a TXOP) and a size limit (e.g., a one-hundred bytes or less), In these embodiments, the STA3 may be configured to refrain from including the time-critical ULL UL data when transmission could not be completed before an end of the uplink MU OFDMA data transmission. In some embodiments, the latency requirement for time-critical ULL data is less than or equal to one millisecond (1 ms) with a size limit of 100 bytes, although the scope of the embodiments is not limited in this respect.

In some embodiments, the UL MU OFDMA data transmission may comprise concurrent uplink transmissions from the first STA and the second STA. In these embodiments, the dedicated RU may be orthogonal to the RUs allocated to the first and second STAs for the UL MU OFDMA data transmission. In some embodiments, the resource units (RUs) of an UL PPDU that are allocated to the first and second STAs for the uplink MU OFDMA data transmission exclude the one or more RUs of the UL PPDU that are dedicated for time-critical communications.

In some embodiments, the STA3 may be part of a basic service set (BSS) that includes the AP and a plurality of STAs including the STA (i.e., STA3) and including the first STA and second STA. In these embodiments, the trigger frame 702 may be encoded to indicate that one or more of the dedicated RU are assigned to one or more STAs of the BSS that have indicated that they expect to have time-critical ULL UL data during a time frame that includes the UL MU OFDMA data transmission.

In some alternate embodiments, the trigger frame 702 may indicate that a dedicated RU is not assigned to any particular STA of the BSS and may be used to send time-critical ULL data to the AP, although the scope of the embodiments is not limited in this respect.

In some embodiments, when the UL PPDU is an 80 MHz PPDU 730 (see FIG. 7C), the dedicated RU may comprise a center 26-tone RU and the first and second RUs are 484 tone RUs (see FIG. 7C, for example), although the scope of the embodiments are not limited in this respect.

Some embodiments are directed to reception of time-critical ultra-low latency downlink (ULL DL) data from the AP during a DL multi-user OFDMA (DL MU-OFDMA) data transmission to the first and second STA (see FIG. 7B for example). In these embodiments, the DL MU-OFDMA transmission may comprise a DL PPDU. In these embodiments, the STA3 may be configured to decode a signal field (SIG) of the DL PPDU. The SIG may be one of a EHT-SIG and a U-SIG. In these embodiments, the SIG field may include configuration information for a dedicated RU for time-critical ULL DL data. In these embodiments, the dedicated RU may be one RU of one or more RUs of the DL PPDU that are reserved for time-critical ULL DL data. In these embodiments, during the DL PPDU, the STA3 may decode one or more MPDUs with a length field set to zero prior to decoding a data frame MPDU that includes the time-critical ULL DL data. An example of these embodiments is illustrated in FIG. 7B. In these embodiments, the AP may include MAC padding in the MAC payload of the DL TB PPDU until the time-critical ULL DL data is available at the MAC layer of the AP from the upper layer. The MAC padding may comprise one or more MPDUs with a length field set to zero. In these embodiments, the AP may include a data frame MPDU within the MAC payload when the time-critical ULL DL data is available at the MAC layer. The MAC payload of the data frame MPDU may include the time-critical ULL DL data and may have the length field set to a non-zero value.

In some embodiments, the STA3 may be configured to align symbol times of the time-critical ULL data with symbol times of the UL MU OFDMA data transmission by the first and second STAs, although the scope of the embodiments are not limited in this respect.

Some embodiments are directed to a non-transitory computer-readable storage medium that stores instructions for execution by processing circuitry of a station (STA) (i.e., STA3). In these embodiments, the processing circuitry may be configured to decode a trigger frame 702 received from an access point station (AP) 102 (see FIG. 7A). The trigger frame 702 may be encoded to indicate resource units (RUs) 704, 706 of an UL PPDU 730 for an uplink multi-user orthogonal frequency division multiple access (UL MU OFDMA) data transmission by a first and a second station STA (i.e., STA1 and STA2). In these embodiments, the trigger frame 702 may further encoded to indicate configuration information for a dedicated RU 708 for time-critical ultra-low latency (ULL) UL data. The dedicated RU may be one RU of one or more RUs of the UL PPDU 730 (see FIG. 7C) that are reserved for time-critical communications. In these embodiments, processing circuitry of the STA3 may encode the time-critical ULL UL data for transmission on the dedicated RU 708 during the uplink MU OFDMA data transmission by the first and second STAs. In these embodiments, the time-critical ULL UL data configured to start at a time (i.e., any time) during transmission of the UL PPDU 730.

Some embodiments are directed to an access point station (AP). In these embodiments, for receipt of time-critical ultra-low latency (ULL) UL data, the AP may encode a trigger frame 702 for transmission to a third station (i.e., STA3). The trigger frame 702 may be encoded to indicate resource units (RUs) 704, 706 of an UL PPDU 730 for an uplink multi-user orthogonal frequency division multiple access (UL MU OFDMA) data transmission by a first and a second station STA (i.e., STA1 and STA2). In these embodiments, the trigger frame 702 may further be encoded by the AP to indicate configuration information for a dedicated RU 708 for time-critical ultra-low latency (ULL) UL data. In these embodiments, the dedicated RU may be one RU of one or more RUs of the UL PPDU 730 (see FIG. 7C) that are reserved for time-critical communications. In these embodiments, the AP may decode the time-critical ULL UL data received from the STA3 on the dedicated RU 708 during the uplink MU OFDMA data transmission by the first and second STAs, the time-critical ULL UL data configured to start at a time (i.e., any time) during transmission of the UL PPDU 730.

In these embodiments, for reception of time-critical ULL UL data during the UL MU OFDMA data transmission, the AP may decode a PHY UL trigger-based PPDU (UL TB PPDU) 800 (see FIG. 8) received on the dedicated RU from the STA3. The UL TB PPDU may initially include medium access control layer (MAC) padding 710 in a MAC payload of the UL TB PPDU. The MAC padding may comprise one or more MAC Protocol Data Units (MPDUs) 802 with a length field set to zero. In these embodiments, the UL TB PPDU may subsequently include a data frame MPDU 804 within the MAC payload. In these embodiments, the MAC payload of the data frame MPDU may comprise the time-critical ULL UL data and having a length field set to a non-zero value.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

FIG. 9 illustrates a functional block diagram of a wireless communication device, in accordance with some embodiments. In one embodiment, FIG. 9 illustrates a functional block diagram of a communication device (STA) that may be suitable for use as an AP STA, a non-AP STA or other user device in accordance with some embodiments. The communication device 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 900 may include communications circuitry 902 and a transceiver 910 for transmitting and receiving signals to and from other communication devices using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication device 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication device 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 900 may include one or more of a keyboard, a display, a non-volatile memory port, multiple antennas, a graphics processor, an application processor, speakers, and other mobile device elements. The display may be an LCD screen including a touch screen.

Although the communication device 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 900 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a station (STA), the apparatus comprising:

processing circuitry; and memory, wherein the processing circuitry is configured to:

decode a trigger frame received from an access point station (AP), the trigger frame encoded to indicate resource units (RUs) of an UL PPDU for an uplink multi-user orthogonal frequency division multiple access (UL MU OFDMA) data transmission by a first and a second station STA, the trigger frame further encoded to indicate a dedicated RU for time-critical ultra-low latency (ULL) UL data, the dedicated RU being one RU of one or more RUs of the UL PPDU that are reserved for time-critical communications; and encode the time-critical ULL UL data for transmission on the dedicated RU during the uplink MU OFDMA data transmission by the first and second STAs, the time-critical ULL UL data configured to start at a time during transmission of the UL PPDU, wherein for transmission of the time-critical ULL UL data during the UL MU OFDMA data transmission, the processing circuitry is configured to:

encode an UL trigger-based PPDU (UL TB PPDU) for transmission on the dedicated RU by:

include medium access control layer (MAC) padding in a MAC payload of the UL TB PPDU until the time-critical ULL UL data is available at a MAC layer from an upper layer, the MAC padding comprising one or more MAC Protocol Data Units (MPDUs) with a length field set to zero; and include a data frame MPDU within the MAC payload when the time-critical ULL UL data is available at the MAC layer, the MAC payload of the data frame MPDU comprising the time-critical ULL UL data and having a length field set to a non-zero value.

2. The apparatus of claim 1, wherein the processing circuitry is further configured to:

include additional MAC padding after the data frame MPDU; and wherein when additional time-critical ULL UL data is available during the UL MU OFDMA data transmission, encode a second data frame MPDU within the MAC payload that includes the additional time-critical ULL UL data, the second data frame MPDU transmitted after the additional MAC padding.

3. The apparatus of claim 2, wherein the time-critical ULL UL data have a latency requirement, wherein the processing circuitry is configured to refrain from including the time-critical ULL UL data when transmission could not be completed before an end of the uplink MU OFDMA data transmission.

4. The apparatus of claim 1, wherein the UL MU OFDMA data transmission comprises concurrent uplink transmissions from the first STA and the second STA, and wherein the dedicated RU is orthogonal to the RUs allocated to the first and second STAs for the UL MU OFDMA data transmission.

5. The apparatus of claim 4, wherein the RUs that are allocated to the first and second STAs for the uplink MU OFDMA data transmission exclude the one or more RUs of the UL PPDU that are dedicated for the time-critical communications.

6. The apparatus of claim 5, wherein a basic service set (BSS) includes the AP and a plurality of STAs including the STA, and the first and second STA, and wherein the trigger frame is encoded to indicate that one or more of the dedicated RU are assigned to one or more STAs of the BSS that have indicated that they expect to have time-critical ULL UL data during a time frame that includes the UL MU OFDMA data transmission.

7. The apparatus of claim 6, wherein when the UL PPDU is an 80 MHz PPDU, and the dedicated RU comprises a center 26-tone RU.

8. The apparatus of claim 1, wherein for reception of time-critical ultra-low latency downlink (ULL DL) data from the AP during a DL multi-user OFDMA (DL MU-OFDMA) data transmission to the first and second STA, the DL MU-OFDMA transmission comprising a DL PPDU, the processing circuitry is configured to:

decode a signal field (SIG) of the DL PPDU, the SIG being one of a EHT-SIG and a U-SIG, the SIG field including configuration information for a dedicated RU for time-critical ULL DL data, the dedicated RU for time-critical ULL DL data being one RU of one or more RUs of the DL PPDU that are reserved for the time-critical ULL DL data;

during the DL PPDU, decode one or more MPDUs with a length field set to zero prior to decoding a data frame MPDU that includes the time-critical ULL DL data.

9. The apparatus of claim 1, wherein the processing circuitry is configured to align symbol times of the time-critical ULL UL data by the STA with symbol times of the UL MU OFDMA data transmission by the first and second STAs.

10. A non-transitory computer-readable storage medium that stores instructions for execution by processing circuitry of a station (STA), the processing circuitry is configured to decode a trigger frame received from an access point station (AP), the trigger frame encoded to indicate resource units (RUs) of an UL PPDU for an uplink multi-user orthogonal frequency division multiple access (UL MU OFDMA) data transmission by a first and a second station STA, the trigger frame further encoded to indicate a dedicated RU for time-critical ultra-low latency (ULL) UL data, the dedicated RU being one RU of one or more RUs of the UL PPDU that are reserved for time-critical communications; and encode the time-critical ULL UL data for transmission on the dedicated RU during the uplink MU OFDMA data transmission by the first and second STAs, the time-critical ULL UL data configured to start at a time during transmission of the UL PPDU, wherein for transmission of the time-critical ULL UL data during the UL MU OFDMA data transmission, the processing circuitry is configured to:

encode an UL trigger-based PPDU (UL TB PPDU) for transmission on the dedicated RU by:

include medium access control layer (MAC) padding in a MAC payload of the UL TB PPDU until the time-critical ULL UL data is available at a MAC layer from an upper layer, the MAC padding comprising one or more MAC Protocol Data Units (MPDUs) with a length field set to zero; and include a data frame MPDU within the MAC payload when the time-critical ULL UL data is available at the MAC layer, the MAC payload of the data frame MPDU comprising the time-critical ULL UL data and having a length field set to a non-zero value.

11. The non-transitory computer-readable storage medium of claim 10, wherein the processing circuitry is further configured to:

include additional MAC padding after the data frame MPDU; and wherein when additional time-critical ULL UL data is available during the UL MU OFDMA data transmission, encode a second data frame MPDU within the MAC payload that includes the additional time-critical ULL UL data, the second data frame MPDU transmitted after the additional MAC padding.

12. The non-transitory computer-readable storage medium of claim 11, wherein the time-critical ULL UL data have a latency requirement, wherein the processing circuitry is configured to refrain from including the time-critical ULL UL data when transmission could not be completed before an end of the uplink MU OFDMA data transmission.

13. The non-transitory computer-readable storage medium of claim 10, wherein the UL MU OFDMA data transmission comprises concurrent uplink transmissions from the first STA and the second STA, and wherein the dedicated RU is orthogonal to the RUs allocated to the first and second STAs for the UL MU OFDMA data transmission.

14. The non-transitory computer-readable storage medium of claim 13, wherein the RUs that are allocated to the first and second STAs for the uplink MU OFDMA data transmission exclude the one or more RUs of the UL PPDU that are dedicated for the time-critical communications.

15. The non-transitory computer-readable storage medium of claim 14, wherein a basic service set (BSS) includes the AP and a plurality of STAs including the STA, and the first and second STA, and wherein the trigger frame is encoded to indicate that one or more of the dedicated RU are assigned to one or more STAs of the BSS that have indicated that they expect to have time-critical ULL UL data during a time frame that includes the UL MU OFDMA data transmission.

16. The non-transitory computer-readable storage medium of claim 15, wherein when the UL PPDU is an 80 MHz PPDU, and the dedicated RU comprises a center 26-tone.

17. An apparatus for an access point station (AP), the apparatus comprising: processing circuitry; and memory, wherein the processing circuitry is configured to:

encode a trigger frame for transmission to a third station (STA3), the trigger frame encoded to indicate resource units (RUs) of an UL PPDU for an uplink multi-user orthogonal frequency division multiple access (UL MU OFDMA) data transmission by a first and a second station STA, the trigger frame further encoded to indicate a dedicated RU for time-critical ultra-low latency (ULL) UL data, the dedicated RU being one RU of one or more RUs of the UL PPDU that are reserved for CRITICAL time-critical communications; and decode the time-critical ULL UL data received from the STA3 on the dedicated RU during the uplink MU OFDMA data transmission by the first and second STAs, the time-critical ULL UL data configured to start at a time during transmission of the UL PPDU, wherein for reception of the time-critical ULL UL data during the UL MU OFDMA data transmission, the processing circuitry is configured to:

decode an UL trigger-based PPDU (UL TB PPDU) received on the dedicated RU from the STA3, the UL TB PPDU initially including medium access control layer (MAC) padding in a MAC payload of the UL TB PPDU, the MAC padding comprising one or more MAC Protocol Data Units (MPDUs) with a length field set to zero, the UL TB PPDU subsequently including a data frame MPDU within the MAC payload, the MAC payload of the data frame MPDU comprising the time-critical ULL UL data and having a length field set to a non-zero value.

* * * * *